US009127200B2

(12) United States Patent
Lee et al.

(10) Patent No.: US 9,127,200 B2
(45) Date of Patent: Sep. 8, 2015

(54) LIQUID CRYSTALLINE MEDIUM AND LIQUID CRYSTAL DISPLAY

(75) Inventors: Seung-Eun Lee, Seoul (KR); Sang-Kyu Lee, Seeheim-Jugenheim (DE); Heui-Seok Jin, Gyeonggi-Do (KR); Won-Hoon Park, Seoul (KR); Karl Skjonnemand, Southampton (GB); David Wilkes, Darmstadt (DE); Kevin Adlem, Bournemouth (GB); Patricia Saxton, Romsey (GB); Owain Llyr Parri, Ringwood (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/696,144

(22) PCT Filed: Apr. 26, 2011

(86) PCT No.: PCT/EP2011/002086
§ 371 (c)(1),
(2), (4) Date: Nov. 5, 2012

(87) PCT Pub. No.: WO2011/137986
PCT Pub. Date: Nov. 10, 2011

(65) Prior Publication Data
US 2013/0056680 A1    Mar. 7, 2013

(30) Foreign Application Priority Data

May 6, 2010    (EP) .................................... 10004794

(51) Int. Cl.
*C09K 19/58*    (2006.01)
*C09K 19/20*    (2006.01)
*C09K 19/46*    (2006.01)
C09K 19/04    (2006.01)
C09K 19/30    (2006.01)
C09K 19/54    (2006.01)

(52) U.S. Cl.
CPC .............. *C09K 19/586* (2013.01); *C09K 19/20* (2013.01); *C09K 19/2028* (2013.01); *C09K 19/46* (2013.01); *C09K 19/588* (2013.01); *C09K 2019/0444* (2013.01); *C09K 2019/0448* (2013.01); *C09K 2019/2035* (2013.01); *C09K 2019/301* (2013.01); *C09K 2019/3015* (2013.01); *C09K 2019/3077* (2013.01); *C09K 2019/3083* (2013.01); *C09K 2019/548* (2013.01)

(58) Field of Classification Search
CPC .. C09K 19/586; C09K 19/20; C09K 19/2028; C09K 19/46; C09K 19/588; C09K 2019/0448; C09K 2019/2035; C09K 2019/301; C09K 2019/3015; C09K 2019/3077; C09K 2019/3083; C09K 2019/548; C09K 2019/0444
USPC ............. 252/299.01, 299.6, 299.63; 349/182, 349/183; 428/1.1
See application file for complete search history.

(56) References Cited

U.S. PATENT DOCUMENTS

| 6,130,738 | A  | * | 10/2000 | Hatano et al. ................. 349/156 |
| 7,534,474 | B2 | * | 5/2009  | Farrand et al. ................. 428/1.1 |
| 7,544,400 | B2 |   | 6/2009  | Goulding et al. |
| 7,623,214 | B2 |   | 11/2009 | Coles et al. |
| 8,372,307 | B2 | * | 2/2013  | Farrand et al. ........... 252/299.63 |
| 8,377,519 | B2 |   | 2/2013  | Farrand et al. |
| 8,409,469 | B2 |   | 4/2013  | Schott et al. |
| 2008/0142758 | A1 |   | 6/2008  | Golding et al. |
| 2010/0296038 | A1 |   | 11/2010 | Farrand et al. |

FOREIGN PATENT DOCUMENTS

| EP | 1 477 547 A1 | 11/2004 |   |
| GB | 2 387 603 A  | * 10/2003 | ................. 252/299.6 |
| JP | 2003206485 A | 7/2003 |   |
| JP | 2007308534 A | 11/2007 |   |
| JP | 2007533792 A | 11/2007 |   |
| JP | 2008524347 A | 7/2008 |   |
| JP | 2008525331 A | 7/2008 |   |
| JP | 2009144135 A | 7/2009 |   |
| JP | 2009540023 A | 11/2009 |   |
| WO | 2005080529 A1 | 9/2005 |   |
| WO | WO 2006/066688 A1 | 6/2006 |   |

(Continued)

OTHER PUBLICATIONS

International Search Report of PCT/EP2011/002086 (Aug. 24, 2011).

(Continued)

*Primary Examiner* — Geraldina Visconti
(74) *Attorney, Agent, or Firm* — Millen, White, Zelano & Branigan, P.C.

(57) ABSTRACT

The instant invention relates to liquid crystalline media comprising a chiral component, component A, consisting of one or more chiral compounds, optionally, a bimesogenic component, component B, consisting of one or more bimesogenic compounds, a liquid crystalline component, component C, consisting of one or more liquid crystalline, respectively mesogenic compounds, and a reactive mesogenic component, component D, comprising, one or more reactive mesogenic compounds, as defined in claim 1, to their stabilization by polymerization and to the polymer-stabilized liquid crystal materials, as well as to liquid crystal displays comprising these liquid crystal media, respectively these stabilized materials, especially to USH-displays and in particular to active matrix displays and, last not least, to the processes of preparation of the respective composite systems and of the displays comprising these systems.

22 Claims, No Drawings

(56) References Cited

FOREIGN PATENT DOCUMENTS

| WO | WO 2007/140863 A1 | 12/2007 |
| WO | 2010022891 A1 | 3/2010 |
| WO | WO 2010/022891 A1 | 3/2010 |

OTHER PUBLICATIONS

English abstract of WO2005/080529—publication dated Sep. 1, 2005.
English abstract and machine translation of JP 2007-308534—publication date Nov. 29, 2007.
English abstract and machine translation of JP 2009-144135 (A)—publication date Jul. 2, 2009.
English machine translation of JP 2009-540023 (A)—publication date Nov. 19, 2009.
English machine translation of JP 2007-533792 (A)—publication date Nov. 22, 2007.
English machine translation of JP 2008-525331 (A)—publication date Jul. 17, 2008.
English abstract of JP2003206485—publication date Jul. 22, 2003.

\* cited by examiner

LIQUID CRYSTALLINE MEDIUM AND LIQUID CRYSTAL DISPLAY

FIELD OF THE INVENTION

The present invention relates to liquid crystalline media, preferably to cholesteric (chiral doped nematic) media, comprising one or more non-reactive liquid crystalline compounds, one or more chiral dopants, optionally one or more bimesogenic compounds and one or more reactive mesogenic compounds, respectively, to such liquid crystalline media comprising one or more non-reactive liquid crystalline compounds, one or more chiral dopants and optionally one or more bimesogenic compounds, stabilized by a polymer and to liquid crystal displays comprising these media, especially to displays operating in the USH mode and in particular to displays addressed by an active matrix.

STATE OF THE ART AND PROBLEM TO BE SOLVED

Liquid Crystal Displays (LCDs) are widely used to display information. LCDs are used for direct view displays, as well as for projection type displays. The electro-optical mode which is employed for most displays still is the twisted nematic (TN)-mode with its various modifications. Besides this mode, the super twisted nematic (STN)-mode and more recently the optically compensated bend (OCB)-mode and the electrically controlled birefringence (ECB)-mode with their various modifications, as e.g. the vertically aligned nematic (VAN), the patterned ITO vertically aligned nematic (PVA)-, the polymer stabilized vertically aligned nematic (PSVA)-mode and the multi domain vertically aligned nematic (MVA)-mode, as well as others, have been increasingly used. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In Plane Switching (short IPS) mode (as disclosed e.g. in DE 40 00 451 and EP 0 588 568) and the Fringe Field Switching (FFS) mode. Especially the latter mentioned electro-optical modes, which have good viewing angle properties and improved response times, are increasingly used for LCDs for modern desktop monitors and even for displays for TV and for multi media applications and thus are competing with the TN-LCDs.

Further to these displays, new display modes using cholesteric liquid crystals having a relatively short cholesteric pitch have been proposed for use in displays exploiting the so called "flexo-electric" effect. In these displays the cholesteric liquid crystals are oriented in the "uniformly lying helix" arrangement (ULH), which also give this display mode its name. In this mode, however several problems still have to be resolved, which are, amongst others, difficulties in obtaining the required uniform orientation, an unfavourably high voltage required for addressing, which is incompatible with common driving electronics, a not really dark "off state", which deteriorates the contrast, and, last not least, a pronounced hysteresis in the electro-optical characteristics.

A relatively new display mode, the so-called uniformly standing helix (USH) mode, may be considered as an alternative mode to succeed the IPS, as it can show improved black levels, even compared to other display mode providing wide viewing angles (e.g. IPS, VA etc.).

For the USH mode, like for the ULH mode, flexo-electric switching has proposed, using bimesogenic liquid crystal materials. However, due to the unfavourably high driving voltage required, to the relatively narrow phase range of the chiral nematic materials and to their irreversible switching properties, these materials are not compatible for used with current LCD driving schemes.

Surprisingly it has now been found that LCDs operating in the USH mode using calamitic LC material, having high values of the dielectric anisotropy ($\Delta\varepsilon$) allows to apply dielectric switching as an alternative concept to flexoelectric switching to overcome above mentioned difficulties. Furthermore, it has been found that polymer stabilization of the materials, preferably using RM materials is very beneficial for the recovery of initial black state of the displays.

The liquid crystals (LCs) according to the present invention are preferably used in improved LCDs using cholesteric liquid crystals, which are also known as chiral nematic liquid crystals, with short helical pitch and with high dielectric anisotropy especially for advanced applications. They are particularly useful for operation in reflected mode, as cholesteric liquid crystals having an appropriate cholesteric pitch selectively reflect light they may be coloured and allow to avoid the use of colour filters in LCDs.

For these applications new liquid crystalline media with improved properties are required. Thus liquid crystalline media with improved behaviour are required. Their rotational viscosity should be as low as possible. Besides this parameter, the media have to exhibit a suitably wide range of the nematic phase, respectively the cholesteric phase, an appropriate birefringence ($\Delta n$), preferably in the range from 0.100 to 0.300 and a suitably high dielectric anisotropy ($\Delta\varepsilon$). $\Delta\varepsilon$ has to be sufficiently high to allow a reasonably low operation voltage. Preferably $\Delta\varepsilon$ should be 20 or more, more preferably 30 or more, in order to allow use easy accessible drivers with reasonably low operation voltages. However, $\Delta\varepsilon$ should preferably be 260 or less and in particular not higher than 200, as this would be detrimental for an at least reasonably high specific resistivity, which in turn is another requirement, especially for active matrix addressing. Most preferably $\Delta\varepsilon$ should be in the range of 50 to 180, more preferably either in the range of 60 to 90 or in the range from 100 to 160.

The displays according to the present invention are preferably active matrix LCDs, short AMDs, addressed by an active matrix, preferably by a matrix of thin film transistors (TFTs). However, the inventive liquid crystals can also beneficially be used in displays with other known addressing means.

Liquid crystal compositions suitable for LCDs and in particular for TN-displays are already widely known. These compositions, however, do have significant drawbacks. Most of them, besides having other deficiencies, lead to unfavourably high response times and/or to contrast ratios, which are too low for many applications. They also most generally have insufficient reliability and stability, in particular against exposure to heat, moisture or irradiation by light and in particular UV, especially when one or more these stressors are combined with each other.

Thus, there is a significant need for liquid crystalline media with improved suitable properties for practical applications such as a wide nematic phase range, appropriate optical anisotropy $\Delta n$, according to the display mode used, a high value of $\Delta\varepsilon$, low viscosities, in particular low rotational viscosities ($\gamma_1$), high contrast ratios in displays and especially fast response times and a good reliability.

PRESENT INVENTION

Surprisingly, it now has been found that liquid crystalline media with a suitable phase range, suitably high values of $\Delta\varepsilon$ and Δn and suitably low viscosities can be realized, which allow stabilization with respective polymerisable compounds and, hence allow the realization of displays do not exhibit the drawbacks of the displays of the prior art or at least do exhibit them to a significantly lesser degree.

The present invention relates to liquid crystalline media, preferably to dielectrically positive, chiral nematic media, comprising a chiral component, component A, consisting of one or more chiral compounds, optionally, a bimesogenic component, component B, consisting of one or more bimesogenic compounds, a liquid crystalline component, component C, consisting of one or more liquid crystalline, respectively mesogenic compounds, a reactive component, component D, preferably a mesogenic component, comprising, preferably consisting of, one or more reactive mesogenic compounds and optionally a polymerisation initiator, to a method of their stabilisation by polymerising the reactive component and to liquid crystal displays comprising these media, respectively these polymer stabilised materials, especially to displays addressed by an active matrix.

The improved liquid crystalline displays according to the instant application preferably fulfil the following conditions. They preferably comprise
one or more, preferably one or two and, most preferably a pair of substrates
at least one of them, preferably only one of them, bearing one or more electrodes, preferably interdigital electrodes, more preferably chevon type electrodes, and
at least one of them, preferably each one of them, bearing an orientation layer for planar alignment of liquid crystalline media or being otherwise treated for planar orientation of liquid crystalline media,
a liquid crystal material according to the present invention.

The improved liquid crystalline mixtures according to the instant application preferably fulfil the following conditions. They preferably
either comprise
a chiral component, component A, consisting of one or more chiral compounds,
optionally, a bimesogenic component, component B, consisting of one or more bimesogenic compounds, preferably with a symmetric structure and an odd number of atoms in the spacer group between the two mesogenic units and/or one or more bimesogenic compounds with a non-symmetric structure, preferably with an odd number of atoms in the spacer group between the two mesogenic units,
a liquid crystalline component, component C, consisting of one or more liquid crystalline, respectively mesogenic compounds, which preferably are non-reactive and non-bimesogenic compounds, and
a reactive mesogenic component, component D, comprising, preferably consisting of, one or more reactive mesogenic compounds
or comprise
a chiral component, component A, consisting of one or more chiral compounds,
optionally, a bimesogenic component, component B, consisting of one or more bimesogenic compounds, preferably with a symmetric structure and an odd number of atoms in the spacer group between the two mesogenic units and/or one or more bimesogenic compounds with a non-symmetric structure, preferably with an odd number of atoms in the spacer group between the two mesogenic units,
a liquid crystalline component, component C, consisting of one or more liquid crystalline, respectively mesogenic compounds, which preferably are non-reactive and non-bimesogenic compounds,
and are stabilized by a polymer preparable from respective precursors.

Preferably the cholesteric liquid crystal material according to the present invention is aligned in a uniformly standing helix structure with a helical pitch preferably of 400 nm or less, more preferably of 350 nm or less, and, most preferably of 320 nm or less.

Further, preferably the following conditions are fulfilled:
both substrates are bearing an orientation layer for planar alignment of liquid crystalline materials or being otherwise treated for planar alignment of liquid crystalline materials and/or
the liquid crystalline material comprises, preferably consists of
a liquid crystalline medium, having low molecular weight, preferably exhibiting a nematic phase, respectively a cholesteric phase, and
a polymeric material, preferably a mesogenic polymer, more preferably a liquid crystalline polymer, and preferably
either the liquid crystalline medium is dispersed in the polymer material or vice versa.

Preferably the respective components of cholesteric liquid crystal material fulfil the following conditions:
the chiral component, component A,
consists of one or more chiral compounds, preferably of on or more mesogenic compounds and/or
comprises one or more chiral compounds exhibiting an absolute value of the HTP of 50 $\mu m^{-1}$ or more, preferably of 80 $\mu m^{-1}$ or more, and/or
the bimesogenic component, component B,
comprises one or more bimesogenic compounds, with a symmetric structure, preferably with an odd number of atoms in the spacer group between the two mesogenic units and/or
comprises one or more bimesogenic compounds with a non-symmetric structure, preferably with an odd number of atoms in the spacer group between the two mesogenic units and/or
the liquid crystalline component, component C,
comprises one or more dielectrically positive compounds and/or
comprises one or more dielectrically neutral and/or
consists of one or more liquid crystalline compounds, respectively mesogenic compounds,
consists of non-reactive and non-bimesogenic compounds only, and/or
exhibits a nematic phase, preferably over a range from 0° C. or less to 80° C. or more, and/or
exhibits a dielectric anisotropy of 40 or more, preferably of 50 or more and/or
exhibits a birefringence of 0.14 or more, preferably of 0.15 or more and/or
the reactive mesogenic component, component D
is capable to act as a polymer precursor and/or
comprises one or more mono-reactive mesogenic compounds and/or
comprises one or more poly-reactive, preferably di-reactive, mesogenic compounds and/or
optionally comprises one or more isotropic reactive compounds and/or
optionally comprises one or more polymerisation initiators.

With regard to the chiral component, component A it is preferred that said component is a mesogenic component, preferably consisting of chiral compounds, preferably comprising one or more compounds selected from the group of formulae I, I' and I"

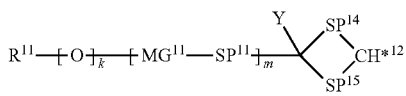

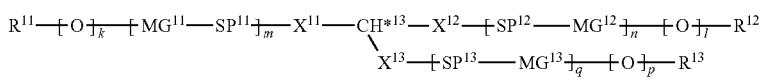
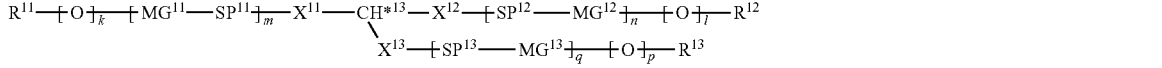

wherein
- $R^{11}$, $R^{12}$ and $R^{13}$ are each, independently of one another, H, F, Cl, CN, $NO_2$, NCS, SCN, OCN, a straight-chain or branched alkyl group with 1 to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCOO—, —S—CO—, —CO—S—, —CH=CH—, —CH=CF—, —CF=CH—, —CF=CF— or —C≡C— in such a manner, that oxygen atoms are not linked directly to one another, or, in case they are not linked to an O atom;
- Y has the meaning given for $R^{11}$ and is preferably H, F, $CH_3$ or $CF_3$, more preferably H or F;
- $SP^{11}$, $SP^{12}$ and $SP^{13}$ are each, independently of one another, a divalent spacer group comprising 1 to 40, preferably 4 to 20, C atoms, preferably an alkylene group, it being also possible for one or more $CH_2$ groups in the spacer groups to be replaced, in each case independently from one another, by —O—, —S—, —NH—, —N($CH_3$)—, —CO—, —COO—, —OCO—, —OCOO—, —S—CO—, —CO—S—, —CH=CH—, —CH=CF—, —CF=CH—, —CF=CF—, —$CF_2$— or —C≡C— in such a manner, that oxygen atoms are not linked directly to one another;
- $SP^{14}$ and $SP^{15}$ are each, independently of one another, a divalent spacer group comprising 1 to 40, preferably 4 to 20, C atoms;
- $X^{11}$, $X^{12}$ and $X^{13}$ are each, independently of one another, —O—, —S—, —CO—, —COO—, —OCO—, —OCOO—, —CO—NH—, —NH—CO—, —$CH_2CH_2$—, —$OCH_2$—, —$CH_2O$—, —$SCH^2$—, —$CH_2S$—, —CF=CF—, —CH=CH—, —OCO—CH=CH—, —C≡C— or a single bond;
- k, l, n, m, p and q each are each, independently of one another, 0 or 1, with m being preferably 1;
- m+n+q is 1, 2 or 3, for formula I preferably 2, for formula I' preferably 1 and for formula I" preferably 2 or 3 and most preferably 2;
- $MG^{11}$, $MG^{12}$ and $MG^{13}$ are each, independently of one another, a mesogenic group, preferably of the formula I'''

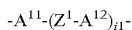     I''' wherein
  - $A^{11}$ and $A^{12}$ are each, independently of one another, a bivalent ring group containing preferably at least four C atoms, preferably a five- or a six-membered ring and preferably has the meaning given for ring $A^{31}$ under formula III below;
  - $Z^1$ each have, independently of one another, the meaning given for $Z^{31}$ under formula III below; and
- i1 is 0, 1 or 2, preferably 0 or 1;

$CH^{*11}$ is a chiral, bivalent group, preferably with a chiral center or with one or more chiral atoms preferably selected from the group of formulae Ia to In

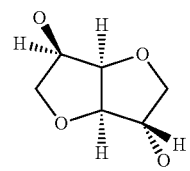    Ia

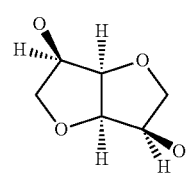    Ib

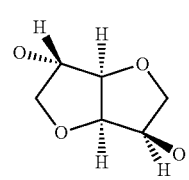    Ic

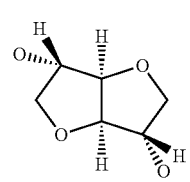    Id

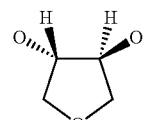    Ie

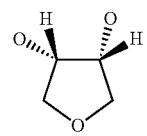    If

Ig
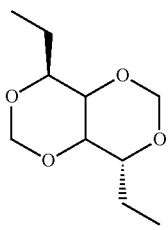

Ih
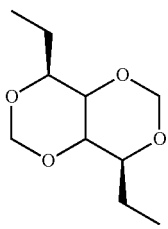

Ii
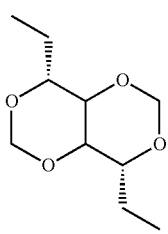

Ij
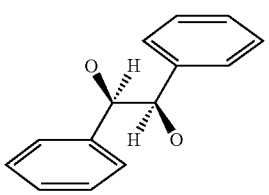

Ik
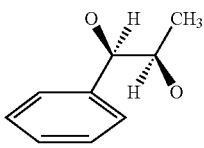

Il
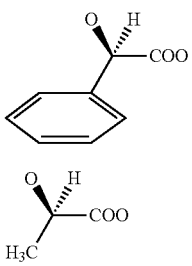

Im
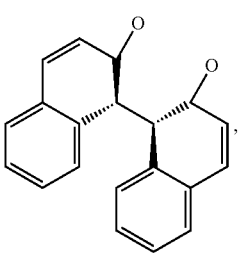

In or their mirror images, if not depicted;
CH*$^{12}$ is a chiral, bivalent group, preferably with a chiral center or with one or more chiral atoms preferably selected from the group of formulae Ie, If and In, or their mirror images, if not depicted, especially preferred In; and CH*$^{13}$ is a chiral, trivalent group, preferably with a chiral center or with one or more chiral atoms preferably —CH=, —CF=, —C(CH$_3$)=, —C(OCH$_3$)= or —C(CF$_3$)=;

where in all groups Ia to Ik, and especially preferred in the aromatic rings of groups Ij, Ik, Il and In, optionally one or more hydrogen atoms can be replaced by further aromatic rings, aliphatic rings, alkyl chains, alkoxy chains, alkenyl chains and alkenyloxy chains, which all may be substituted by halogen atoms, especially fluorine, or CN.

With regard to the optional, bimesogenic component, component B, of the liquid crystal medium according to the invention said component is preferably a mesogenic component preferably consisting of bimesogenic compounds, preferably comprising one or more compounds of formula II,

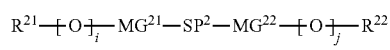

wherein
$R^{21}$ and, $R^{22}$ are each, independently of one another, F, Cl, CN, NO$_2$, NCS, SCN, OCN, a straight-chain or branched alkyl group with 1 to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCOO—, —S—CO—, —CO—S—, —CH=CH—, —CH=CF—, —CF=CH—, —CF=CF— or —C≡C— in such a manner, that in the whole molecule oxygen atoms are not linked directly to one another, or, in case they are not linked to an O atom, one or both of them may be H;

MG$^{21}$ and MG$^{22}$ are each, independently of one another, a mesogenic group and have preferably the meaning given for MG$^{11}$ under formula I above, SP$^2$ is a divalent spacer group comprising 1 to 40, preferably 3 to 20, C atoms, preferably an alkylene group, it being also possible for one or more CH$_2$ groups in the spacer groups to be replaced, in each case independently from one another, by —O—, —S—, —NH—, —N(CH$_3$)—, —CO—, —COO—, —OCO—, —OCOO—, —S—CO—, —CO—S—, —CH=CH—, —CH=CF—, —CF=CH—, —CF=CF—, —CF$_2$— or —C≡C— in such a manner, that oxygen atoms are not linked directly to one another;

i and j are, independently of each other, 0 or 1;

wherein the moiety $R^{21}$—[—O—]$_i$-MG$^{21}$- either is identical to the moiety $R^{22}$—[—O—]$_j$-MG$^{22}$, i.e. the compound of formula II is symmetric, or the moiety $R^{21}$—[—O—]$_i$-MG$^{21}$- is different from the moiety $R^{22}$—[—O—]$_j$-MG$^{22}$-, i.e. the compound of formula II is non-symmetric.

Preferably the media comprise besides said at least one non-symmetric bimesogenic compound also one or more bimesogenic compounds having a symmetric structure.

With regard to the liquid crystalline component, component C, it is preferred that said component is consisting of dielectrically positive compounds and optionally of dielectrically neutral compounds and/or dielectrically negative compounds. It preferably comprises one or more dielectrically positive compounds of formula III and, optionally, further dielectrically positive compounds

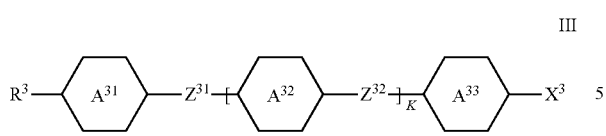

wherein

R³ is H, F, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms;

X³ CN or NCS;

$Z^{31}$ and $Z^{32}$, independently of each other, and in case $Z^{31}$ is present twice, also these independently of each other, are —CH₂—CH₂—, —CF₂—CF₂—, —CF₂—O—, —O—CF₂—CO—O— or a single bond, preferably —CH₂—CH₂—, —CO—O— or a single bond;

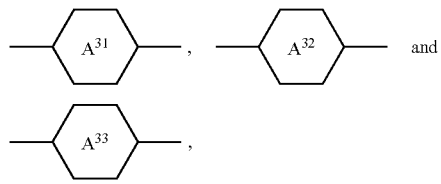

independently of each other, and in case

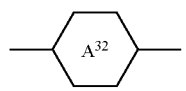

is present twice, also these independently of each other, are

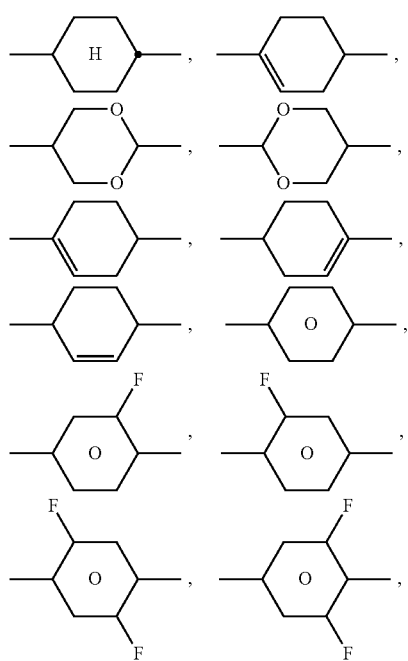

K is 0, 1 or 2, preferably 0 or 1.

Optionally the liquid crystalline component, component C, comprises one or more dielectrically negative compounds, preferably selected from the group of compounds of formula IV

wherein $R^{41}$ and $R^{42}$ independently of each other have the meaning given for R³ under formula III above:

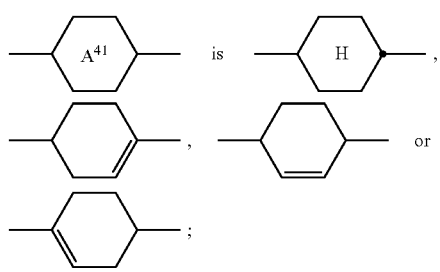

one of

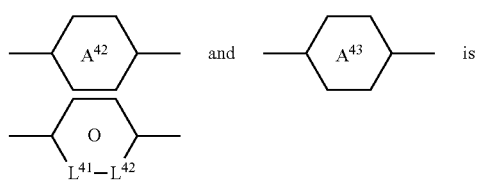

and the other one has, or the other two, independently of each other, have the same meaning, or one of the meanings given for

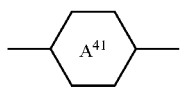

or are

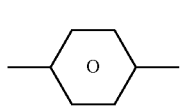, 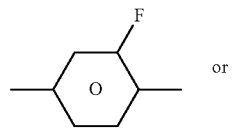

optionally one of

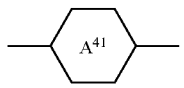 and 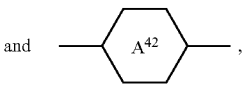, preferably

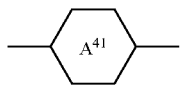

is, or both are

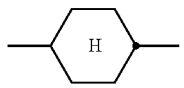;

$L^{41}$ and $L^{42}$ are, independently of each other, =C(—F)— or =N—, preferably at least one of them is =C(—F)— and, most preferably, both of them are =C(—F)—;

$Z^{41}$ and $Z^{42}$ are, independently of each other, —CH$_2$CH$_2$—, —COO—, trans-CH=CH—, trans-CF=CF—, —CH$_2$O—, —CF$_2$O— or a single bond, preferably at least one of them is a single bond and most preferably both are a single bond; and L is 0 or 1 or 2, preferably 0 or 1.

Optionally, preferably obligatorily, the liquid crystalline component, component C, comprises one or more dielectrically neutral compounds, preferably selected from the group of compounds of formula V

V

wherein $R^{51}$ and $R^{52}$, independently of each other, have the meaning given for $R^3$ under formula III above;

the rings $A^{51}$, $A^{52}$ and $A^{53}$, independently of each other, and in case ring $A^{52}$ is present twice, also these independently of each other, have the meaning given for ring $A^{31}$ under formula III above;

$Z^{51}$ and $Z^{52}$, independently of each other, have the meaning given for $Z^{31}$ under formula III above; and M is 0 or 1 or 2, preferably 0 or 1.

Preferably the liquid crystalline component, component C, additionally or alternatively to the compounds of formula III, comprises one or more dielectrically positive compounds selected from the group of compounds of formula VI

VI

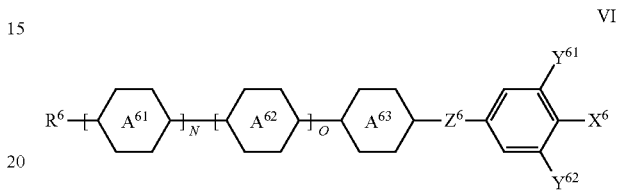

wherein $R^6$ has the meaning given for $R^3$ under formula III above;

the rings $A^{61}$, $A^{62}$ and $A^{63}$, independently of each other have the meaning given for ring $A^{31}$ under formula III above and preferably

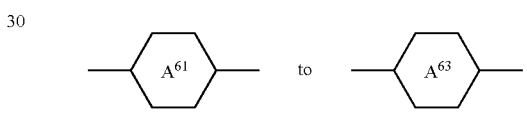

are independently of each other

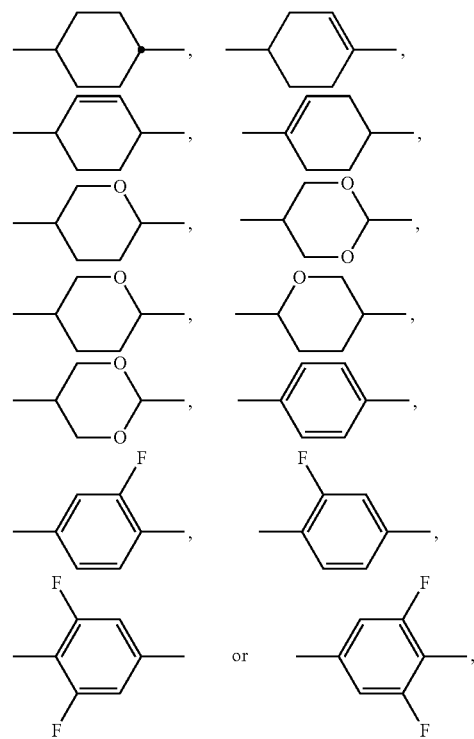

more preferably

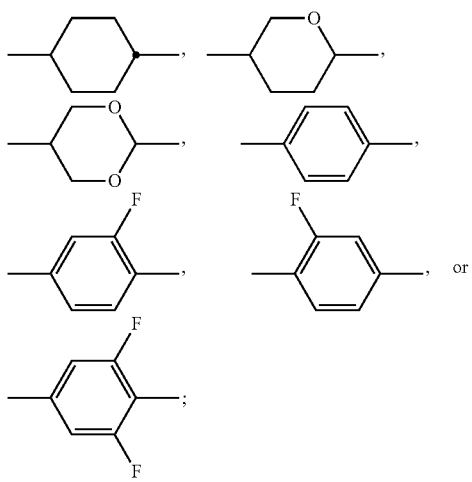

$X^6$ is F, Cl, —CF$_3$, —OCF$_2$H or —OCF$_3$, preferably F or —OCF$_3$;

$Y^{61}$ and $Y^{62}$ are independently of one another H or F, preferably $Y^{61}$ is F and $Y^{62}$ is H or F;

$Z^6$ is —COO—, —CF$_2$O—, —CH$_2$CH$_2$—, —CH=CH— or a single bond, preferably —COO—, —CF$_2$O— or a single bond, more preferably —COO— or a single bond and, most preferably, a single bond; and N and O are independently of one another 0 or 1, the sum of (N+O) preferably is 1 or 2.

In a preferred embodiment of the present invention the liquid crystalline media according to the instant application comprise one or more polymerisable compounds. These polymerisable compounds may be non-mesogenic compounds, like e.g. the well known EHA, resp. 2EHA, or mesogenic compounds. These polymerisable mesogenic compounds are called here "reactive mesogens" (short RMs). These polymerisable compounds, whether mesogenic or non-mesogenic, may be mono-reactive or multi-reactive, preferably di-reactive. Preferably the media comprise both one or more mono-reactive compounds and one or more multi-reactive, preferably di-reactive compounds. Most preferably the media comprise one or more RMs, while non-mesogenic compounds may be present additionally.

The RMs can be chiral or achiral, and can comprise an acrylate/methacrylate group or another polymerisable group. In an especially preferred embodiment the RM are chiral compounds, as this allows the simple adjustment of the wavelength of the selective reflection by polymerising a certain amount of the chiral RM, which thus is no longer available to twist the liquid crystal material, leading to an increased cholesteric pitch and consequently to selective reflection at longer wavelengths. The resultant cholesteric pitch may be beneficially stabilized against further change e.g. by use of an appropriate filter (e.g. UV filter) protecting the liquid crystal from ambient radiation.

In case chiral reactive mesogens are used in the liquid crystalline media according to the present invention, in many cases it is desirable to use a photo initiator in the media, too, when an exposure to UV radiation is applied. The use of a photo initiator leads to a significant reduction of the dose of UV radiation required.

The host mixture contains liquid crystalline compounds having a low molar mass and preferably an amount of one or more chiral dopants sufficient to lead to selective reflection at a wavelength outside of, and, preferably below, the visible range of the electromagnetic spectrum. These cholesteric phases with a relatively short cholesteric pitch preferably are stabilised by a polymer. The stabilisation of the (cholesteric) phase is carried out by adding to the chiral liquid crystalline host mixture one or more polymerisable compounds, preferably RMs, preferably a mixture comprising mono-reactive and di-reactive RMs, plus a suitable photo-initiator, and polymerising the polymerisable compounds, for example by exposure to UV irradiation, for a short time. Preferably the polymerisation is carried out in electro-optical cells maintained at a temperature in the cholesteric phase of the chiral liquid crystalline host mixture.

In case the media comprise one or more polymerisable compounds they preferably additionally comprise one or more polymerisation initiators, e.g. photo initiators and/or thermal initiators.

The liquid crystalline media according to the present invention may be and in a preferred embodiment are stabilized by polymerisation of respective polymer precursors are consisting of said one or more polymerisable compounds and optionally one or more of said initiators. Preferably the stabilising polymer has the morphology of a polymer network, i.e. the liquid crystalline material having a low molecular weight, i.e. the non-polymerisable liquid crystalline material/ mesogenic material is present in a more or less continuous form interspersed with more or less smooth strands of polymeric material. Polymer network stabilised liquid crystals are disclosed e.g. in Dierking, I., Adv. Mater. 12, No. 3, pp. 167-181 (2000).

In a preferred embodiment of the present invention the liquid crystalline media according to the instant application comprise one or more polymerisable compounds and preferably RMs.

The mesogenic mono-reactive compounds used according to the present invention preferably comprise one or more ring elements, linked together by a direct bond or via a linking group and, where two of these ring elements optionally may be linked to each other, either directly or via a linking group, which may be identical to or different from the linking group mentioned. The ring elements are preferably selected from the group of four-, five-, six- or seven-, preferably of five- or six-, membered rings.

The RMs used according to the present invention are preferably selected from the group of formulae VIIA and VIIB

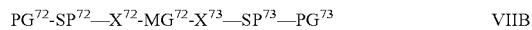

wherein $R^{71}$ is H, F, Cl, Br, I, CN, NO$_2$, NCS, SF$_5$, SO$_2$CF$_3$ or alkyl which is straight chain or branched, preferably has 1 to 20 C-atoms, is unsubstituted, mono- or poly-substituted by F, Cl, Br, I or CN, and in which one or more non-adjacent CH$_2$ groups are optionally replaced, in each case independently from one another, by —O—, —S—, —NH—, —NR$^{01}$—, —SiR$^{01}$R$^{02}$—, —CO—, —COO—, —OCO—, —OCO—O—, —S—CO—, —CO—S—, —CY$^{01}$=CY$^{02}$— or —C≡C— in such a manner that O and/or S atoms are not linked directly to one another, preferably H, Halogen, n-alkyl, n-alkoxy with 1 to 7 C-atoms preferably 2 to 5 C-atoms, alkenyl, alkenyloxy or alkoxyalkyl with 2 to 7 C-atoms, preferably with 2 to 5 C-atoms or CN, NCS, halogen, preferably F, Cl, halogenated alkyl, alkenyl or alkoxy, preferably mono-, di- or oligo-fluorinated alkyl, alkenyl or alkoxy, especially preferred CF$_3$, OCF$_2$H or OCF$_3$, $R^{01}$ and $R^{02}$ are, independently of each other, H or alkyl with 1 to 12 C-atoms,

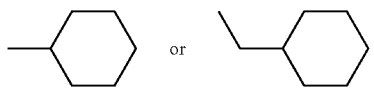

$MG^{71}$ is a mesogenic moiety, preferably comprising one or more rings and most preferably is a divalent radical of the formula

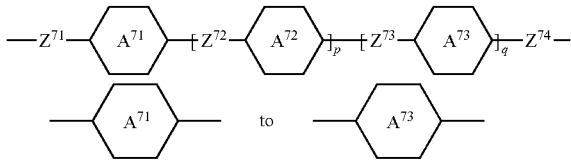

are, independently of each other, an aromatic and/or alicyclic ring, or a group comprising two or more fused aromatic or alicyclic rings, wherein these rings optionally contain one or more hetero atoms selected from N, O and/or S, and are optionally mono- or poly-substituted by $R^{72}$, $Z^{71}$ to $Z^{74}$ are, independently of each other, —O—, —S—, —CO—, —CO—O—, —O—CO—, —S—CO—, —CO—S—, —O—CO—O—, —CO—NR$^{01}$—, —NR$^{01}$—CO—, —OCH$_2$—, —CH$_2$O—, —SCH$_2$—, —CH$_2$S—, —CF$_2$O—, —OCF$_2$—, —CF$_2$S—, —SCF—, —CH$_2$CH$_2$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —(CH$_2$)$_4$—, —CH=CH—CO—O—, —O—CO—CH=CH— or a single bond, $Y^{01}$ and $Y^{02}$ are, independently of each other, F, Cl or CN, and alternatively one of them may be H, $R^{72}$ is H or alkyl, preferably H or alkyl with 1 to 10 C-atoms, $PG^{71}$ is a polymerisable or reactive group, $SP^{71}$ is a spacer group or single bond, and $X^{71}$ has one of the meanings given for $Z^{71}$ and preferably is —O—, —CO—O—, —O—CO—, —CF$_2$O—, —OCF$_2$—, —CH$_2$O—, —OCH$_2$— or a single bond, $MG^{72}$ has the meaning given for $MG^{71}$ above, $PG^{72}$ and $PG^{73}$ independently of each other have one of the meanings given for $PG^{71}$ above, $SP^{72}$ and $SP^{73}$ independently of each other have one of the meanings given for $SP^{11}$ above, and $X^{72}$ and $X^{73}$ independently of each other have one of the meanings given for $X^{71}$ above.

In a preferred embodiment of the present invention the precursor of the polymer comprises, besides the compound(s) of formula VIIA one or more di-reactive mesogenic monomers, preferably of formula VIIB.

The compounds of formulae VIIA and VIIB according to the present invention may be chiral compounds.

Preferably the chiral component, component A, comprises one or more compounds selected from the group of formulae Ia, Ib and I'a, preferably of formula I'a

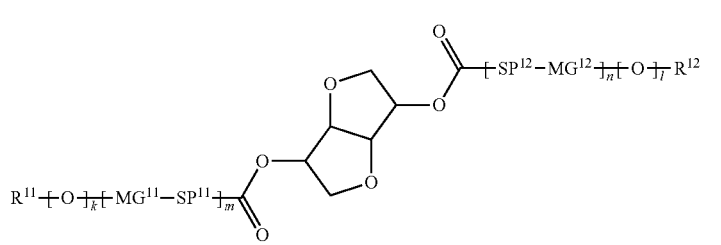

Ia

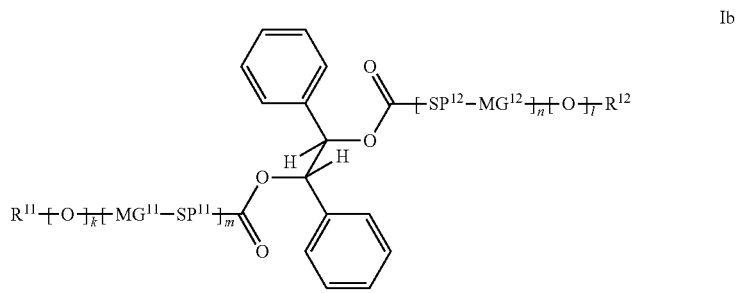

Ib

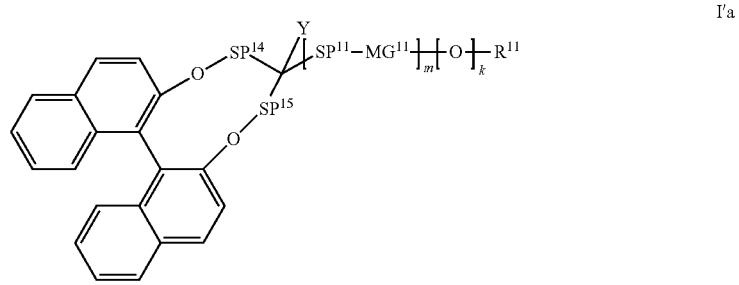

I'a wherein the parameters have the respective meanings given under formula I above and preferably R$^{11}$ and R$^{12}$ are, independently of each other, alkyl or fluorinated alkyl with 1 to 7 C-atoms or alkenyl, alkoxyalkyl or fluorinated alkenyl with 2 to 7 C-atoms.

More preferably the chiral component, component A, comprises one or more compounds selected from the group of formulae Ia-1, Ia-2, I' a-1, Ia'-2 and Ia'-3, preferably of formula I' a-1,

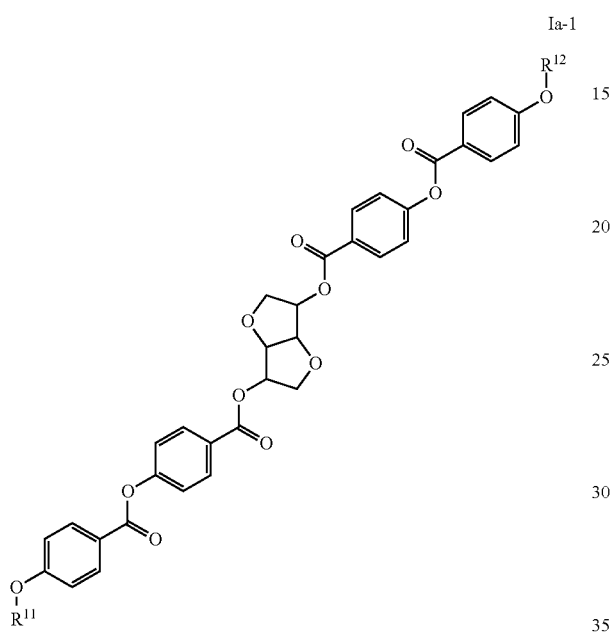

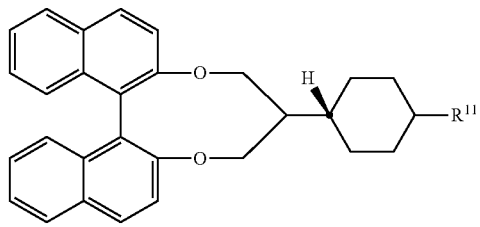

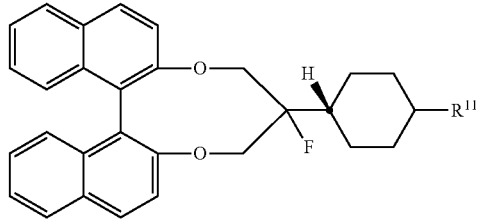

wherein the parameters have the respective meanings given under formula I above and preferably R$^{11}$ and R$^{12}$ are, independently of each other, alkyl or fluorinated alkyl with 1 to 7 C-atoms or alkenyl, alkoxyalkyl or fluorinated alkenyl with 2 to 7 C-atoms.

In a preferred embodiment of the present invention, the bimesogenic component, component B, comprises one or more compounds of formula II, wherein MG$^{21}$ and MG$^{22}$ are identical to each other.

In another preferred embodiment of the present invention the bimesogenic component, component B, comprises one or more compounds of formula II, wherein MG$^{21}$ and MG$^{22}$ are different from each other.

Preferably the bimesogenic component, component B, comprises one or more compounds of formula IIa, preferably one or more compounds each of at least two different formulae selected from this group of formulae

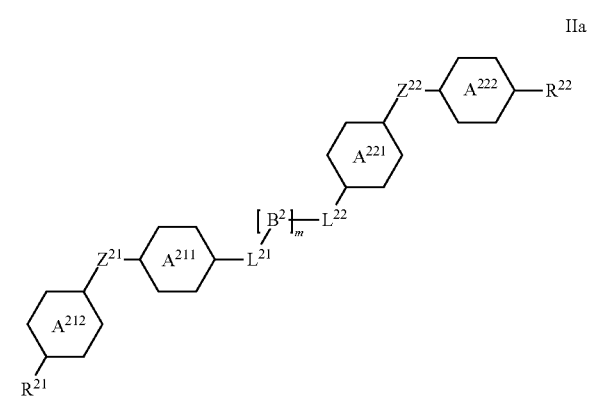

wherein

R$^{21}$ and R$^{22}$, independently of each other have the meaning given under formula II above;

the rings A$^{211}$, A$^{212}$, A$^{221}$ and A$^{222}$, independently of each other have the meaning given for ring A$^{31}$ under formula III above;

Z$^{21}$ and Z$^{22}$, independently of each other have the meaning given for Z$^{31}$ under formula III above;

L$^{21}$ and L$^{22}$, independently of each other have the same meaning as given for X$^{11}$ under formula I, I' or I' above;

$B^2$ is $CH_2$, CFH, $CF_2$ or if present more than once any combination thereof, preferably $CH_2$; and m is an integer from 1 to 19, preferably from 3 to 17 and most preferably from 5 to 13; it is especially preferred that m is an odd number.

Especially preferred are compounds of formulae IIa-1, IIa-2, IIa-3 and IIa-4:

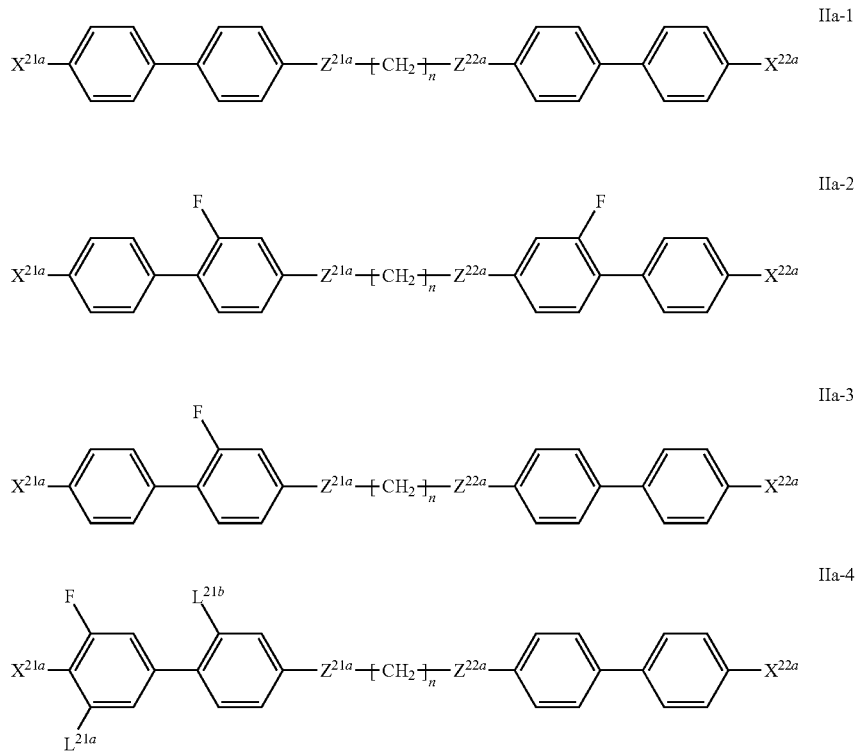

wherein
$X^{21a}$ and $X^{22a}$, independently of each other are CN, F, Cl or fluorinated alkyl or fluorinated alkoxy, each with 1 to 4 C-atoms, preferably CN, $CF_3$, F or Cl, more preferably CN, F or Cl, most preferably CN or F, whereby in formulae IIa-1 and IIa-2 $X^{21a}$ and $X^{22a}$ preferably are different from each other;

$Z^{21a}$ and $Z^{22a}$, independently of each other are —COO—, OCO—, —O— or a single bond, preferably $Z^{21a}$ and $Z^{22a}$ are both —O—, $Z^{21a}$ is —CO—O— and $Z^{22a}$ is —O—CO— or $Z^{21a}$ is —O—CO— and $Z^{22a}$ is —CO—O—, and, most preferably, $Z^{21a}$ and $Z^{22a}$ are both —O— or $Z^{21a}$ is —O—CO— and $Z^{22a}$ is —CO—O—;

$L^{21a}$ and $L^{21b}$ independently of each other are H or F; and n is an odd integer in the range from 1 to 17, preferably from 3 to 15, and, most preferably, from 5 to 13.

Preferably the liquid crystalline media according to the instant invention comprise one or more bimesogenic compounds having an odd number of atoms in the spacer group, preferably one or more bimesogenic compounds selected from the group of compounds of formulae IIa-1 to IIa-4, wherein n is an odd integer.

Optionally the bimesogenic component, component B comprises one or more compounds selected from the group of formulae IIb-1 to IIb-4, which are almost identical with the respective formulae IIa-1 to IIa-4 given above, wherein the parameters have the meanings given above, which, however are different in that $X^{21a}$ and $X^{22a}$ are identical in formulae IIa-1 and IIa-2 and/or n is an even integer in the range from 2 to 18.

In a preferred embodiment of the present invention the liquid crystalline component, component C, of the liquid crystalline media according to the instant application comprises one or more compounds of formula III'

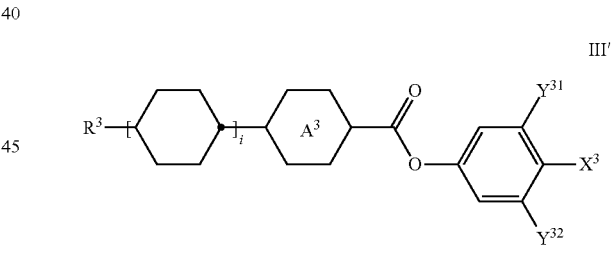

wherein
$R^3$ is alkyl, alkoxy, fluorinated alkyl or fluorinated alkoxy, alkenyl, alkenyloxy, alkoxyalkyl, fluorinated alkenyl or fluorinated alkenyloxy, preferably alkyl or alkoxyalkyl and most preferably n-alkyl,

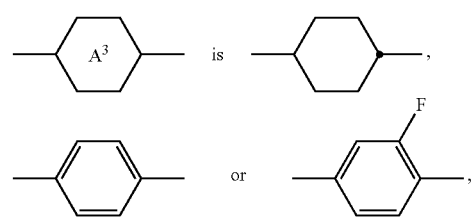

$Y^{31}$ and $Y^{32}$ are independently of each other H or F, preferably $Y^{31}$ is F and $Y^{32}$ is H,
$Y^3$ is CN or NCS, preferably CN, and
i is 0 or 1.

In a more preferred embodiment of the present invention the liquid crystalline media according to the instant application comprise one or more compounds of formula III' selected from the compounds of its following sub-formulae III'-1 to III'-5, preferably selected from formulae III'-2, III'-4 and III'-5, most preferably of formula III'-2 and/or III'-5

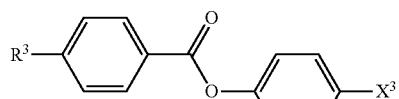

III'-1

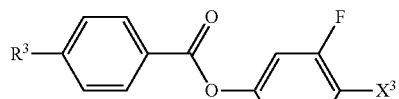

III'-2

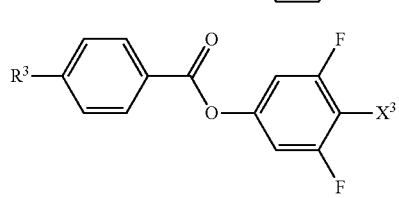

III'-3

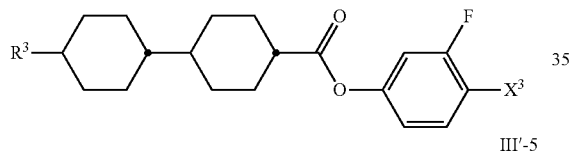

III'-4

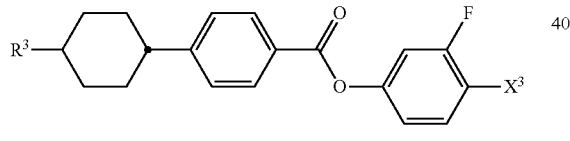

III'-5 wherein $R^3$ has the respective meanings given under formula I above and preferably is alkyl or alkenyl, most preferably n-alkyl or alk-3-enyl, and $X^3$ preferably is CN.

Additionally or alternatively to one or more compounds selected from the group of formulae III'-1 to III'-5, the present invention the liquid crystalline media according to the instant application may comprise one or more compounds of formula III selected from the compounds of its following sub-formulae III'-6 to III'-8, preferably of formula III'-8

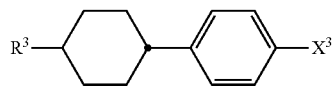

III'-6

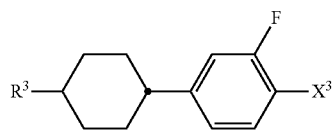

III'-7

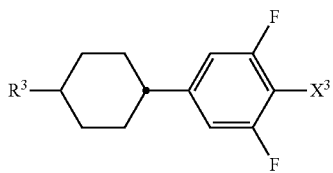

III'-8 wherein $R^3$ has the respective meanings given under formula I above and preferably is alkyl or alkenyl, most preferably n-alkyl or alk-3-enyl, and $X^3$ preferably is CN.

The liquid crystal mixtures according to the present invention optionally comprise one or more dielectrically negative compounds having a dielectrical anisotropy of −1.5 or less, preferably in the range from −1.5 or less to −8 or more. In this case, the liquid crystal mixtures according to the present invention preferably comprise one or more dielectrically negative compounds selected from the following group of formulae IV-1 to IV-8

IV-1

IV-2

IV-3

IV-4

IV-5

IV-6

IV-7

IV-8
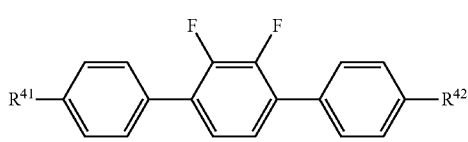

wherein
$R^{41}$ and $R^{42}$ have the respective meaning given under formula IV above.

The liquid crystal mixtures according to the present invention preferably comprise one or more dielectrically neutral compounds. These compounds have a dielectrical anisotropy in the range from −1.5 to +3.0. Preferably these compounds are selected from the following group of formulae V-1 to V-14, preferably of formula V-14

V-1
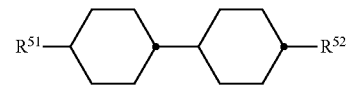

V-2
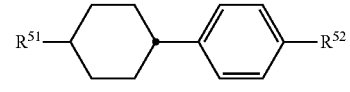

V-3
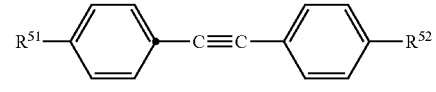

V-4
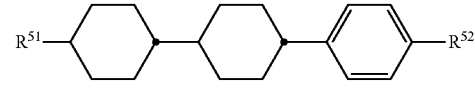

V-5
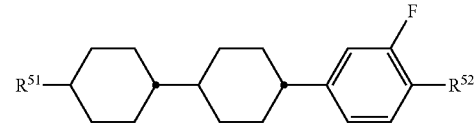

V-6
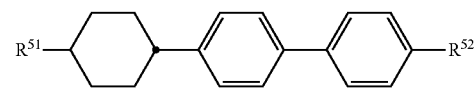

V-7
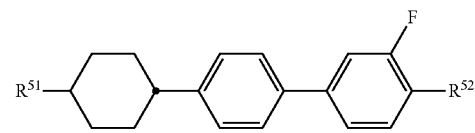

V-8
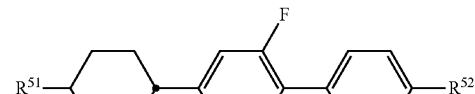

V-9
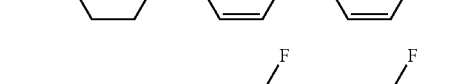

V-10
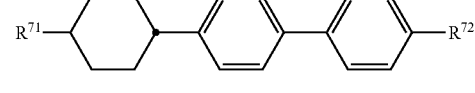

V-11
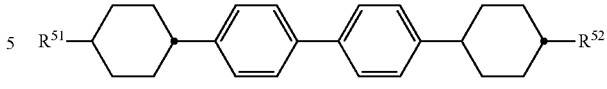

V-12
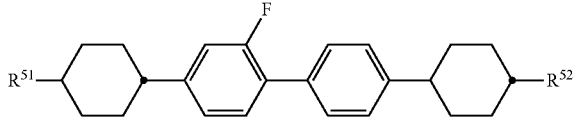

V-13
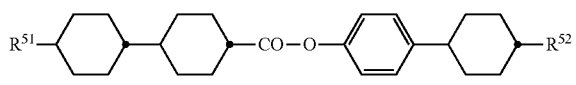

V-14
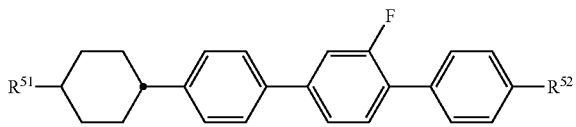

wherein
$R^{51}$ and $R^{52}$ have the respective meaning given under formula V above.

Preferably the liquid crystalline component, component C, comprises one or more compounds selected from the following group of formulae VI-1 to VI-5, preferably one or more compounds each of at least two different formulae selected from this group of formulae, most preferably selected from the group of formulae VI-1, VI-2, VI-3 and VI-5, VI-1
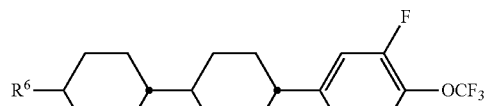

VI-2
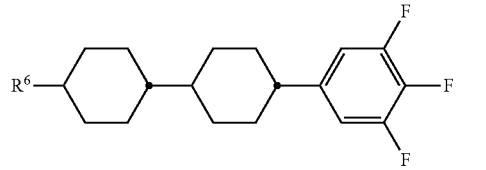

VI-3
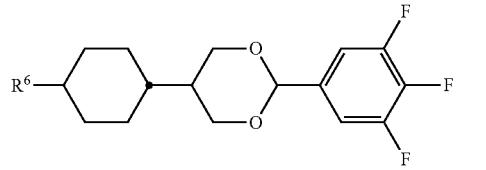

VI-4
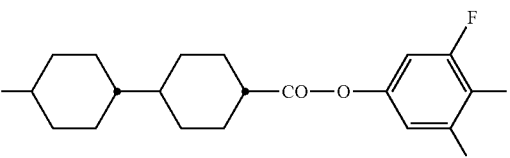

-continued

VI-5

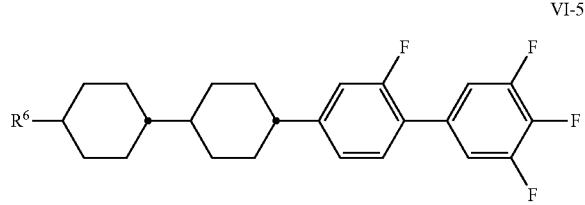

wherein
R$^6$ has the meaning given under formula VI above. X$^3$ is F, Cl or fluorinated alkyl or fluorinated alkoxy, each with 1 to 4 C-atoms, preferably OCF$_3$, OCF$_2$H, F or Cl, most preferably F.

Particularly preferred are polymer precursors comprising one or more compounds of formula VIIA and/or of formula VIIB, wherein
Z$^{71}$ and/or Z$^{74}$ is —O—, —CO—O—, —OCO—, —O—CO—O—, —CH$_2$—O—, —O—CH$_2$—, —CF$_2$—O—, —O—CF$_2$—, —C≡C—, —CH=CH— or a single bond, most preferably —CO—O— or —O—CO— or —O— and/or
Z$^{71}$ is different from a single bond and/or
ring A$^{71}$ is phenylene that is optionally substituted by one or more groups R and/or
R$^{71}$ is alkyl or alkoxy with 1 to 12, preferably 1 to 8 C-atoms, or alkenyl, alkenyloxy or alkynyl with 2 to 12, preferably 2 to 7 C-atoms and/or
SP$^{71}$ is alkylene with 1 to 12 C atoms which is optionally mono- or polysubstituted by F and wherein one or more non-adjacent CH$_2$ may be replaced, in each case independently from one another, by —O—, —CH=CH— or —C≡C—, and that is linked to a ring, preferably to ring "A$^{71}$" via a group selected from —O—, —CO—O—, —O—CO—, —O—CO—O— and a single bond and/or
SP$^{71}$ is a single bond.
Preferences for MG$^{72}$ to X$^{73}$ are the same as for the respective corresponding groups MG$^{71}$ to X$^{71}$.
In a preferred embodiment rings A$^{71}$ to A$^{73}$ are, independently of each other, an aromatic or alicyclic ring, preferably a 5-, 6- or 7-membered ring, or a group comprising two or more, preferably two or three, fused aromatic or alicyclic rings, wherein these rings optionally contain one or more hetero atoms selected from N, O and/or S, and are optionally mono- or poly-substituted with L$^7$, wherein L$^7$ is F, Cl, Br, CN, OH, NO$_2$, and/or an alkyl, alkoxy, alkylcarbonyl or alkoxycarbonyl group with 1 to 12 C atoms, wherein one or more H atoms are optionally replaced by F or Cl.
L$^7$ is preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, in particular F, Cl, CN, CH$_3$, C$_2$H$_5$, OCH$_3$, COCH$_3$ or OCF$_3$, most preferably F, Cl, CH$_3$, OCH$_3$ or COCH$_3$.
Preferred rings A$^{71}$ to A$^{73}$ are, for example, furan, pyrrol, thiophene, oxazole, thiazole, thiadiazole, imidazole, phenylene, cyclohexylene, cyclohexenylene, pyridine, pyrimidine, pyrazine, azulene, indane, naphthalene, tetrahydronaphthalene, decahydronaphthalene, tetrahydropyrane, anthracene, phenanthrene and fluorene.
Particularly preferably one or more of these rings A$^{71}$ to A$^{73}$ is selected from furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydro-naphthalene-2,6-diyl, indane-2,5-diyl, or 1,4-cyclohexylene wherein one or two non-adjacent CH$_2$ groups are optionally replaced by O and/or S, wherein these groups are unsubstituted, mono- or polysubstituted by L as defined above.

Preferably

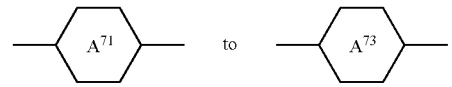

independently of each other are,

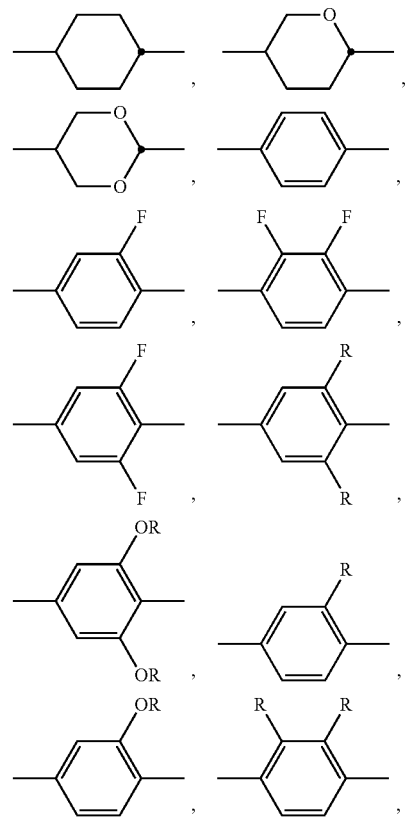

or their mirror images
wherein
R is alkyl with 1 to 12 C-atoms, preferably with 1 to 7 C-atoms, or alkenyl or alkynyl with 2 to 12 C-atoms, preferably with 2 to 7 C-atoms, in both of which one or more non-adjacent —CH$_2$— groups, not adjacent to the phenyl ring, may be replaced by —O— and/or —CH=CH— and/or one or more H-atoms may be replaced by halogen, preferably by F,
and/or preferably

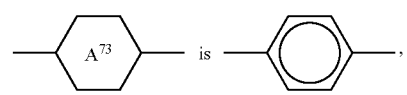

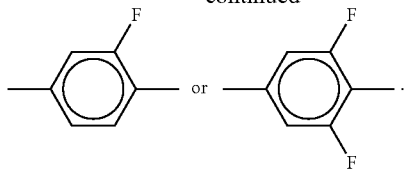

In a preferred embodiment of the present invention the group

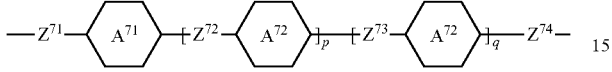

contains only monocyclic rings $A^{71}$ to $A^{73}$. Very preferably this is a group with one or two 5- and/or 6-membered rings.

Preferred sub formulae for this group are listed below. For reasons of simplicity, Phe in these groups is 1,4-phenylene, PheL is a 1,4-phenylene group which is substituted by 1 to 4 groups L as defined above, Cyc is 1,4-cyclohexylene, Pyd is pyridine-2,5-diyl and Pyr is pyrimidine-2,5-diyl. The following list of preferred groups comprises the sub formulae VII-1 to VII-20 as well as their mirror images,

| | |
|---|---|
| -Phe- | VII-1 |
| -Pyd- | VII-2 |
| -Pyr- | VII-3 |
| -PheL- | VII-4 |
| -Cyc- | VII-5 |
| -Phe-Z-Cyc- | VII-6 |
| -Cyc-Z-Cyc- | VII-7 |
| -PheL-Cyc- | VII-8 |
| -Phe-Z-Phe- | VII-9 |
| -Phe-Z-Pyd- | VII-10 |
| -Pyd-Z-Phe- | VII-11 |
| -Phe-Z-Pyr- | VII-12 |
| -Pyr-Z-Phe- | VII-13 |
| -PheL-Z-Phe- | VII-14 |
| -PheL-Z-Pyd- | VII-15 |
| -PheL-Z-Pyr- | VII-16 |
| -Pyr-Z-Pyd- | VII-17 |
| -Pyd-Z-Pyd- | VII-18 |
| -Pyr-Z-Pyr- | VII-19 |
| -PheL-Z-PheL- | VII-20 |

In these preferred groups Z has the meaning of $Z^{71}$ as given in formula VIIA. Preferably Z is —COO—, —OCO—, —CH$_2$CH$_2$—, —C≡C— or a single bond. Very preferably the group

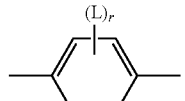

is selected from the following formulae VIIIa to VIIj and their mirror images

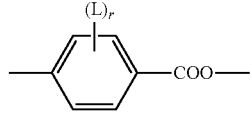
VIIa

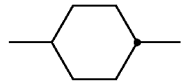
VIIb

VIIc

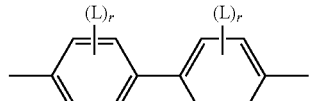
VIId

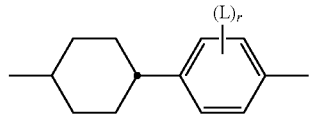
VIIe

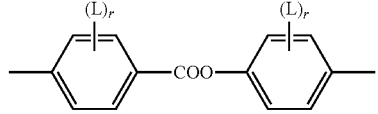
VIIf

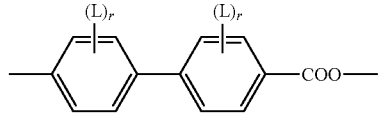
VIIg

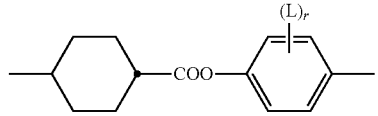
VIIh

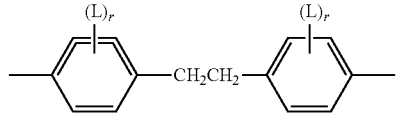
VIIVII

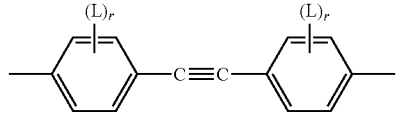
VIIj wherein L is F, Cl, Br, CN, OH, NO$_2$, and/or an alkyl, alkoxy, alkylcarbonyl or alkoxycarbonyl group with 1 to 12 C atoms, wherein one or more H atoms are optionally replaced by F or Cl and r is 0, 1, 2, 3 or 4, preferably 0, 1 or 2.

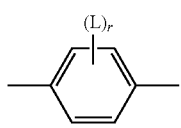

in these preferred formulae is very preferably

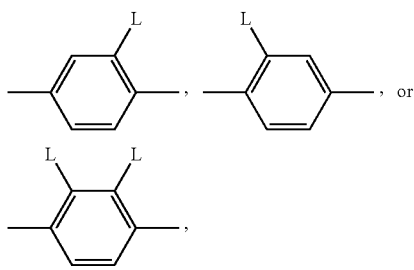

furthermore

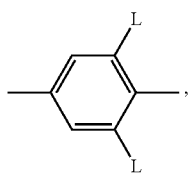

with L having each independently one of the meanings given above.

Especially preferred compounds of formula I comprise at least one group

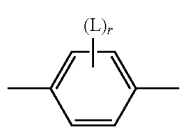

wherein r is 1 or 2

Further preferred compounds of formula I comprise at least two groups

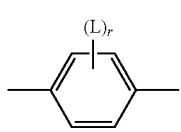

wherein r is 1 and/or at least one group

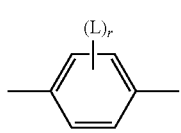

wherein r is 2.

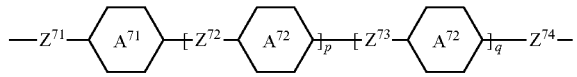

more preferably is

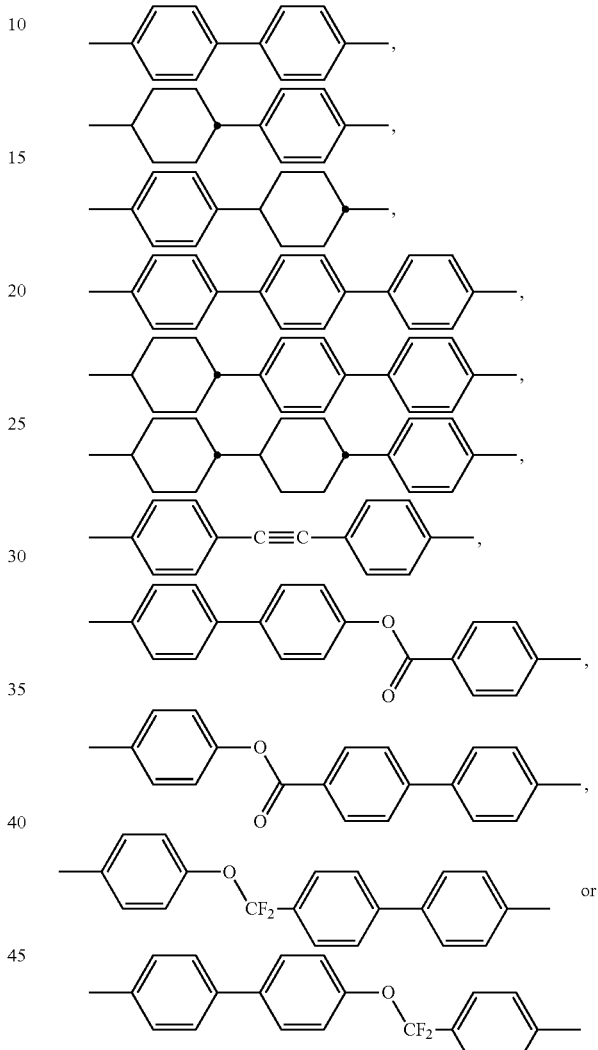

wherein the 1,4-phenylene rings may optionally be substituted by R, preferably by alkyl, preferably by methyl, and/or by alkoxy and/or by halogen, preferably F.

More preferably

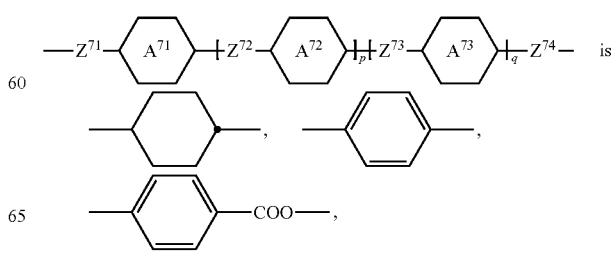

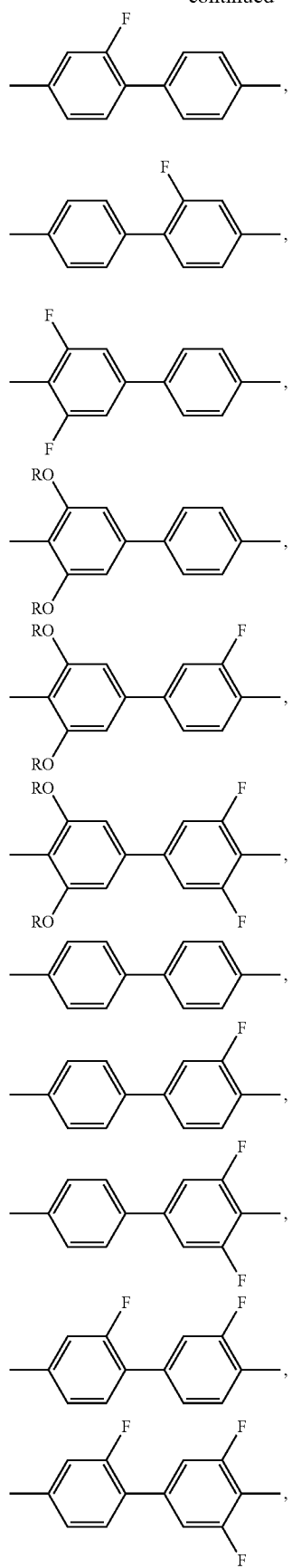
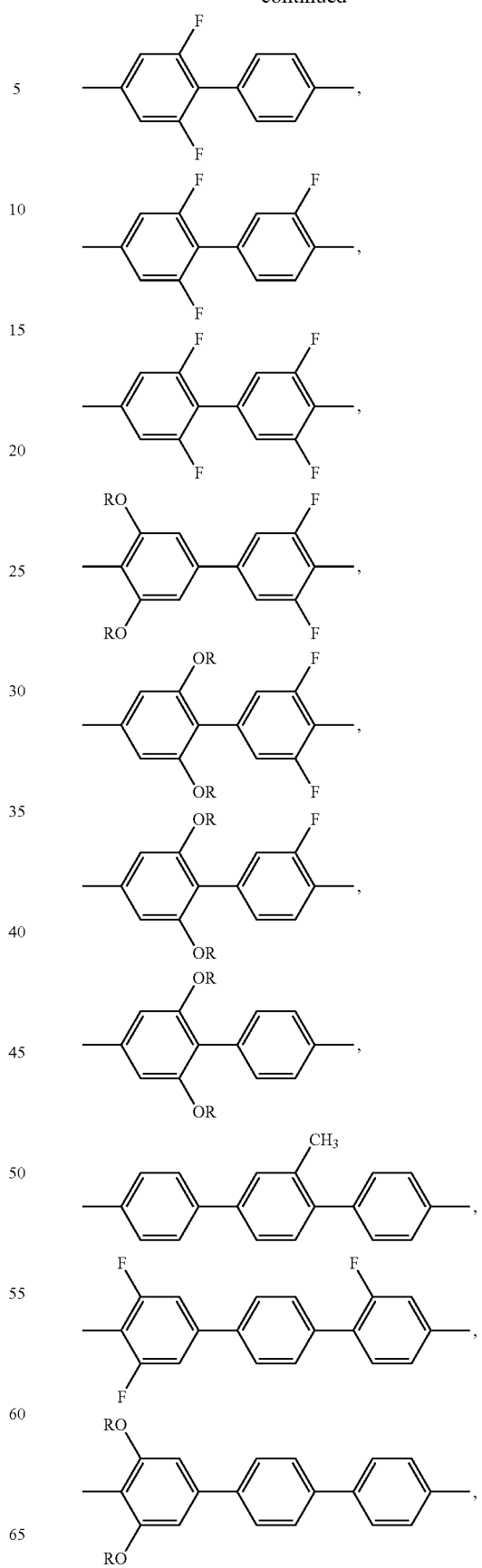

-continued

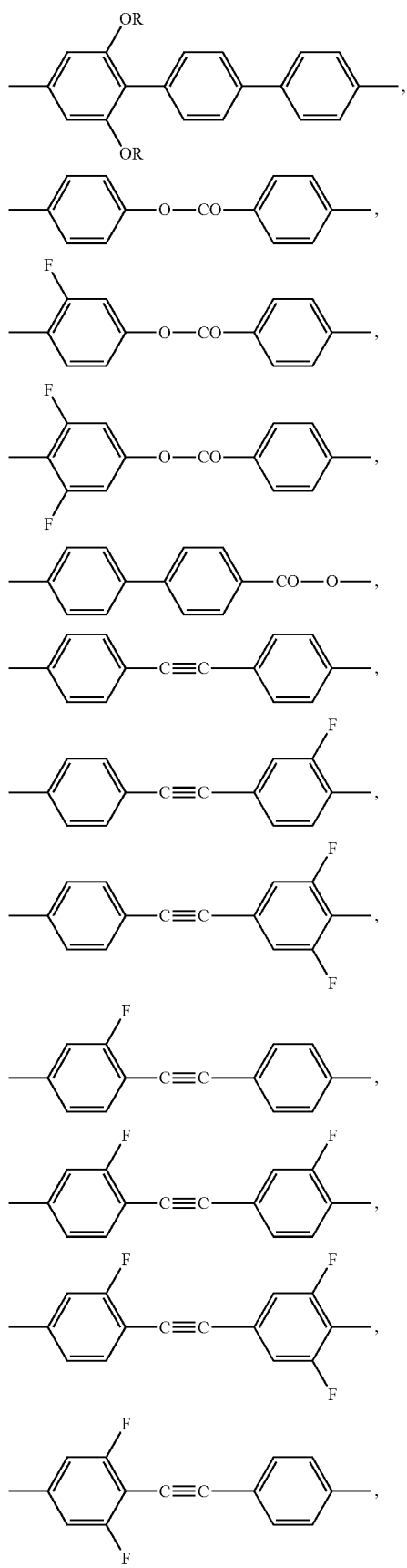

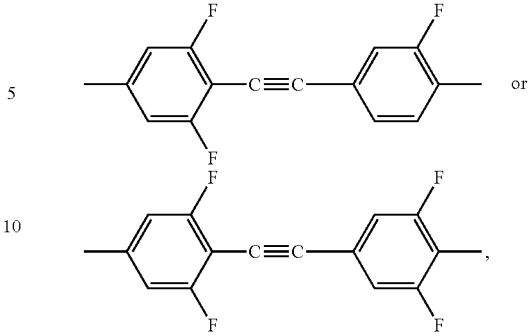

or also their respective mirror images, where not explicitly given, wherein R has the meaning given above and preferably is alkyl, preferably with 1 to 6 C-atoms, preferably n-alkyl, wherein one or more non-adjacent —CH$_2$— groups optionally may be replaced by —O— and/or by —CH=CH— and/or one or more H-atoms may be replaced by halogen, preferably by F.

Preferably the liquid crystalline media according to the instant invention comprise, more preferably predominantly consist of, more preferably essentially consist of and most preferably entirely consist of compounds selected from the group of compounds of formulae I to VI and VIIa and VIIb, more preferably of formulae I, II, III, V, VI and VIIa and/or VIIb.

"Comprising" in this application means in the context of compositions that the entity referred to, e.g. the medium or the component, contains the component or components or of the compound or compounds in question, preferably in a total concentration of 10% or more and most preferably of 20% or more unless explicitly defined otherwise.

In this context the term "predominantly consisting of" means that the entity referred to contains 55% or more, preferably 60% or more and most preferably 70% or more of the component or components or of the compound or compounds in question unless explicitly defined otherwise.

In this context the term "essentially consisting of" means that the entity referred to contains 80% or more, preferably 90% or more and most preferably 95% or more of the component or components or of the compound or compounds in question unless explicitly defined otherwise.

In this context the term "entirely consisting of" means that the entity referred to contains 98% or more, preferably 99% or more and most preferably 100.0% of the component or components or of the compound or compounds in question unless explicitly defined otherwise.

Also other mesogenic compounds, which are not explicitly mentioned above, can optionally and beneficially be used in the media according to the instant invention. Such compounds are known to the expert in the field.

The liquid crystal media according to the instant invention are characterised by a clearing point of 75° C. or more, preferably of 80° C. or more.

The $\Delta\epsilon$, at 589 nm (Na$^D$) and 20° C., of the liquid crystal media according to the instant invention preferably is in the range of 0.120 or more to 0.200 or less, more preferably in the range of 0.130 or more to 0.180 or less and most preferably in the range of 0.140 or more to 0.160 or less.

The $\Delta\epsilon$, at 1 kHz and 20° C., of the liquid crystal medium according to the invention preferably is 30 or more, preferably 40 or more, more preferably 60 or more and most preferably 60 or more, whereas it preferably is 100 or less, more preferably 80 or less and more preferably it is in the range of 30 or more, to 90 or less and most in the range of 40 to 80 and, most preferably in the range of 60 to 70.

Preferably the nematic phase of the inventive media without the chiral dopants extends at least from 0° C. or less to 75° C. or more, more preferably at least from −20° C. or less to 75° C. or more, most preferably at least from −20° C. or less to 80° C. or more and in particular at least from −30° C. or less to 80° C. or more.

The liquid crystalline media are preferably characterized for comparison purposes in TN displays operating in the second transmission minimum according to Gooch and Tarry having an optical retardation (d·Δn) in the range of 1.0 µm or more to 1.1 µm or less. They are, however, preferably used as cholesteric liquid crystals, also called chiral nematic liquid crystals, having a rather short cholesteric pitch, preferably their cholesteric pitch is selected such, that their wavelength of selective reflection is in the in the range in the visible range of the electromagnetic spectrum i.e. in the range from of 400 nm to 800 nm.

Preferably the liquid crystal media contain one or more chiral dopants preferably having an absolute value of the helical twisting power (HTP) of 50 $\mu m^{-1}$ or more, preferably of 60 $\mu m^{-1}$ or more, more preferably in the range of 70 $\mu m^{-1}$ or more, most preferably in the range of 80 $\mu m^{-1}$ or more to 260 $\mu m^{-1}$ or less.

Preferably the liquid crystal media contain 50% to 100%, more preferably 70% to 100% more preferably 80% to 100% and in particular 90% to 100% totally of compounds of formulae I, II, III, IV, V, VI and VIIA and/or VIIB, preferably of formulae I, II, III, V, VI, VIIA and VIIB.

More preferably the liquid crystal media comprise, more preferably predominantly consist of, more preferably essentially consist of and most preferably entirely consist of compounds of formulae I, II, III, IV, V, VI, VIIA and VIIB, preferably of formulae I, II, III, V, VI, VIIA and VIIB.

Compounds of formula I preferably are used in the media in a total concentration from 1% to 15%, more preferably from 2% to 10%, more preferably from 3% to 8% and most preferably from 4% to 7% of the total mixture.

Compounds of formula II preferably are used in the media, if present at all, in a total concentration from 0% to 55%, more preferably from 5% to 20% and most preferably from 6% to 15% of the total mixture.

Compounds of formula III preferably are used in the media in a total concentration from 45% to 75%, more preferably from 50% to 7040% and most preferably from 55% to 65% of component C.

Compounds of formula IV preferably are used in the media in a total concentration from 0% to 35%, more preferably from 0% to 15% and most preferably from 5% to 10% of component C, if present at all.

Compounds of formula V preferably are used in the media in a total concentration from 0% to 30%, preferably from 50% to 25% and most preferably from 10% to 20% of component C.

Compounds of formula VI preferably are used in the media in a total concentration from 5% to 40%, preferably from 10% to 35% and most preferably from 15% to 30% of component C.

The polymerisable compounds, preferably of formulae VIIA and/or VIIB, preferably are used in the media in a total concentration from 3% to 25%, more preferably from 5% to 20% and most preferably from 6% to 15% of the total mixture, prior to polymerisation thereof.

Preferably one or more polymerisation initiators, preferably one or more photo initiators are used. The concentration of the initiators is from 0.1% to 10%, more preferably from 0.2% to 5% and most preferably from 0.5% to 2% of the total concentration of the polymerisable compounds.

Optionally the media according to the present invention may comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

Preferably the media according to the present invention comprise
one or more compounds of formula I and/or formula I', preferably of formula I', more preferably of formula I' a-1, most preferably of formula R-5011 or S-5011, and/or
optionally one or more compounds of formula II, preferably of formula IIa-2 and/or IIa-3, and/or
one or more compounds of formula III', preferably of formulae III'-2 and/or III'-5, and/or
one or more compounds of formula IV, preferably of formula V-13, and/or
one or more compounds of formula VI, preferably of formulae V-1, and/or VI-2 and/or VI-3 and/or VI-5, and/or
one or more reactive polymerisable compounds, preferably one or more compounds of formulae VIIA and/or VIIB-7, preferably both one or more compounds of formula formulae VIIA and one or more compounds of formula VIIB-7 and/or
one or more polymerisation initiators.

In the present application the term dielectrically positive is used for compounds or components with $\Delta\epsilon > 3.0$, dielectrically neutral with $-1.5 \leq \Delta\epsilon \leq 3.0$ and dielectrically negative with $\Delta\epsilon < -1.5$. $\Delta\epsilon$ is determined at a frequency of 1 kHz and at 20° C. The dielectric anisotropy of the respective compound is determined from the results of a solution of 10 of the respective individual compound in a nematic host mixture. In case the solubility of the respective compound in the host mixture is less than 10% its concentration is reduced by a factor of 2 until the resultant mixture is stable enough at least to allow the determination of its properties. Preferably the concentration is kept at least at 5%, however, in order to keep the significance of the results a high as possible. The capacities of the test mixtures are determined both in a cell with homeotropic and with homogeneous alignment. The cell gap of both types of cells is approximately 20 µm. The voltage applied is a rectangular wave with a frequency of 1 kHz and a root mean square value typically of 0.5 V to 1.0 V, however, it is always selected to be below the capacitive threshold of the respective test mixture.

$\Delta\epsilon$ is defined as $(\epsilon_\| - \epsilon_\perp)$, whereas $\epsilon_{av}$ is $(\epsilon_\| + 2\epsilon_\perp)/3$. For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericks-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \epsilon$) is determined at a frequency of 1 kHz. The threshold voltages, as well as all other electro-optical properties have been determined with test cells prepared at Merck KGaA, Germany. The test cells for the determination of $\Delta \epsilon$ had a cell gap of approximately 20 µm. The electrode was a circular ITO electrode with an area of 1.13 cm² and a guard ring. The orientation layers were lecithin for homeotropic orientation ($\epsilon_{\|}$) and polyimide AL-1054 from Japan Synthetic Rubber for planar homogeneous orientation ($\epsilon_{\perp}$). The capacities were determined with a frequency response analyser Solatron 1260 using a sine wave with a voltage of 0.3 $V_{rms}$. The test cells used for the electro-optical measurements have cell gap selected to have an optical retardation in the range from 0.310 µm$^{-1}$ to 0.32 µm$^{-1}$. They have interdigital electrodes, i.e. electrodes of the type used in IPS— displays. Alternatively also cells with chevron type electrodes may be used. The light used in the electro-optical measurements was white light. The set up used was commercially available equipment of Autronic Melchers, Karlsruhe, Germany. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The response times are given as rise time ($\tau_{on}$) for the time for the change of the relative contrast from 0% to 90% ($t_{90}-t_0$), i.e. including the delay time ($t_{10}-t_0$), as decay time ($\tau_{off}$) for the time for the change of the relative contrast from 100% back to 10% ($t_{100}-t_{10}$) and as the total response time ($\tau_{total} = \tau_{on} + \tau_{off}$), respectively.

The liquid crystal media according to the present invention may contain further additives in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application. This also holds for the concentration of the dichroic dyes used in the mixtures, which are not counted when the concentrations of the compounds respectively the components of the host mixture are specified. The concentration of the respective additives is always given relative to the final doped mixture.

The liquid crystal media according to the present invention consist of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

Preferably the liquid crystal media according to the present invention, comprising one or more chiral dopants, is selectively reflecting radiation in a range outside of the visible range of the electromagnetic spectrum, i.e. not in the range from 400 nm to 800 nm. Preferably their band of selective reflection does not extend into this range of wavelengths more preferably at least the centre wavelength of their reflection band lies outside of this range and most preferably their complete reflection band lies outside of this range.

The wavelength of the centre of the resultant selective reflection at a given temperature may be calculated from the actual concentration of the chiral dopant in the host used via the approximation of the polynomial series (I):

$$\lambda_{cent.}[c(\text{dop.})] = \alpha \cdot [c(\text{dop.})]^{-1} + \beta \cdot [c(\text{dop.})]^{-2} + \gamma \cdot [c(\text{dop.})]^{-3} \quad (I)$$

wherein $\alpha$, $\beta$ and $\gamma$ are material constants specific for the combination of a given chiral dopant in a given host mixture and c(dop.) is the concentration of the chiral dopant in the host mixture.

In many practical cases, even consideration only of the first term, the linear term ("$\alpha \cdot [c(\text{dop.})]^{-1}$"), yields results with sufficient accuracy. The parameter "a" is analogous to the inverse of the HTP (i.e. HTP$^{-1}$). Here, in the determination of the wavelength of the selective reflection of a cholesteric LC, which is similar to a "Bagg" reflection, however, the effective refractive index of the mixture has to be taken into account additionally for a more exact numerical description.

Typically the parameters $\alpha$, $\beta$ and $\gamma$ do depend more strongly on the type of the chiral dopant, than on the specific liquid crystal mixture used.

Obviously, they depend on the enantiomeric excess of the respective chiral dopant. They have their respective largest absolute values are for the pure enantiomers and are zero for racemates. In this application the values given are those for the pure enantiomers, having an enantiomeric excess of 98% or more.

Preferably the absolute value of the parameter $\alpha$ of the chiral dopant, respectively the chiral dopants, in the respective liquid crystal medium according to the present application is in the range from 5 nm to 25 nm, more preferably in the range from 10 nm to 20 nm and most preferably in the range from 12 nm to 16 nm.

These media may comprise more than one chiral dopant. In case they comprise two or more chiral dopants, these may beneficially selected in one of the known ways to compensate e.g. against the temperature dependence of the cholesteric pitch and, hence, of the wavelength of selective reflection. Here in one host mixture chiral dopants having the same sign of the parameter $\alpha$ may be used as well as chiral dopants having the opposite sign of this parameter, depending on the nature of the parameters for the terms of higher order of equation (I), in particular of the parameter $\beta$, the parameter of the quadratic term.

More preferred is an embodiment of the present invention using a single chiral dopant, which shows a small temperature dependence of the chiral pitch induced in the respective host mixture, i.e. has a small parameter $\beta$. By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations, which are also called "acronyms". The transformation of the abbreviations into the corresponding structures is straight forward according to the following three tables A to C.

All groups $C_nH_{2n+1}$) $C_mH_{2m+1}$ and $C_lH_{2l+1}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_m$, respectively and —CH=CH— preferably is trans-respectively E vinylene.

Table A lists the symbols used for the ring elements, table B those for the linking groups and table C those for the symbols for the left hand and the right hand end groups of the molecules.

Table D lists exemplary molecular structures together with their respective codes.

TABLE A

| Ring Elements | |
|---|---|
| C |  |
| P | 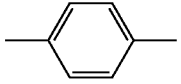 |
| D | 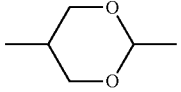 |
| DI | 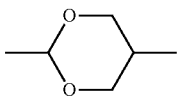 |
| A | 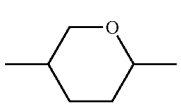 |
| AI | 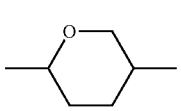 |
| G | 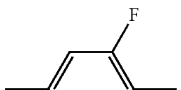 |
| GI | 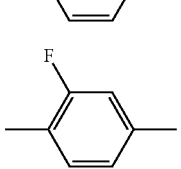 |

TABLE A-continued

| Ring Elements | |
|---|---|
| U | 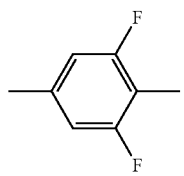 |
| UI | 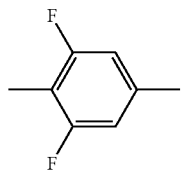 |
| Y | 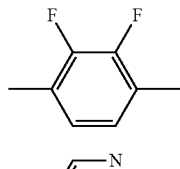 |
| M | 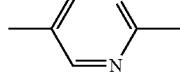 |
| MI | 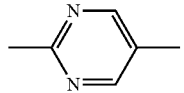 |
| N | 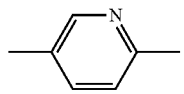 |
| NI | 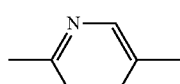 |
| np | 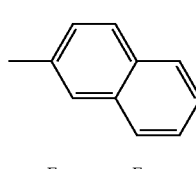 |
| n3f | 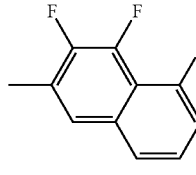 |
| n3fI | 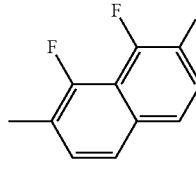 |
| th | 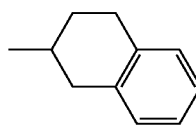 |

TABLE A-continued

Ring Elements

| | | |
|---|---|---|
| thI | 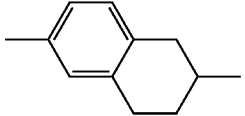 | |
| th2f | 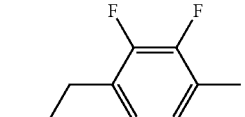 | |
| th2fI | 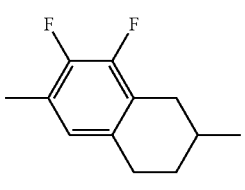 | |
| o2f | 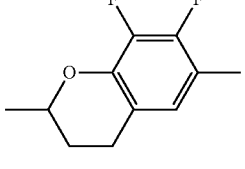 | |
| o2fI | 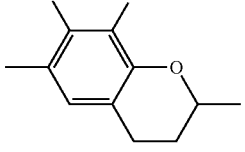 | |
| dh | 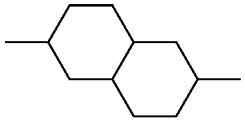 | |
| K | 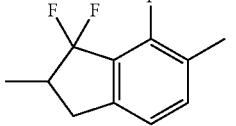 | |
| KI | 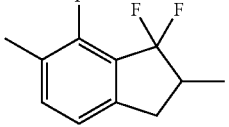 | |
| L | 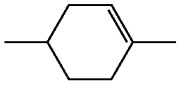 | |
| LI |  | |
| F | 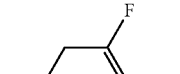 | |
| FI |  | |

TABLE B

Linking Groups

| | | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End Groups

| Left hand side, used alone or in combination with others | | Right hand side, used alone or in combination with others | |
|---|---|---|---|
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |

TABLE C-continued

| End Groups | | | |
|---|---|---|---|
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

| Left hand side, used in combination with others only | | Right hand side, used in combination with others only | |
|---|---|---|---|
| -...n...- | —C$_n$H$_{2n}$— | -...n... | —C$_n$H$_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each are integers and three points "..." indicate a space for other symbols of this table.

Preferably the liquid crystalline media according to the present invention comprise, besides the compound(s) of formula I one or more compounds selected from the group of compounds of the formulae of the following table.

TABLE D

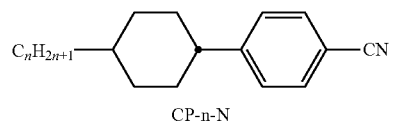

CP-n-N

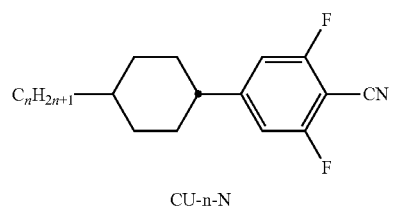

CU-n-N

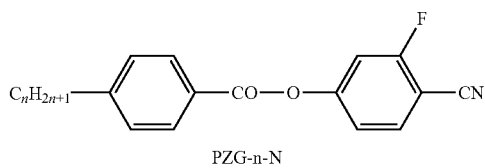

PZG-n-N

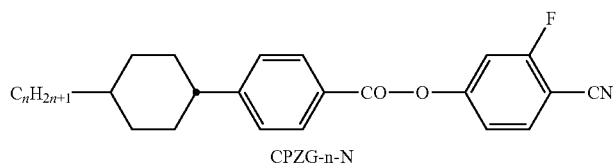

CPZG-n-N

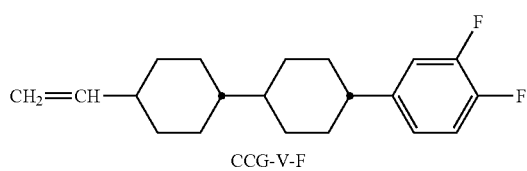

CCG-V-F

TABLE D-continued
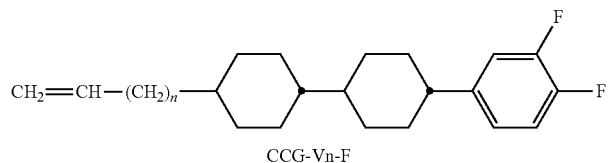
CCG-Vn-F
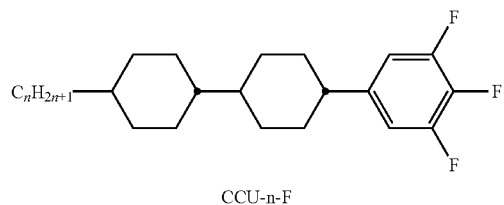
CCU-n-F
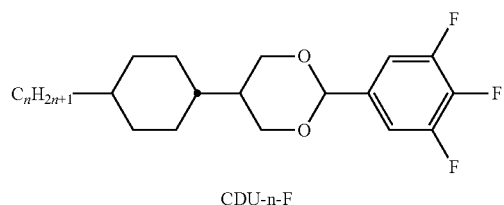
CDU-n-F
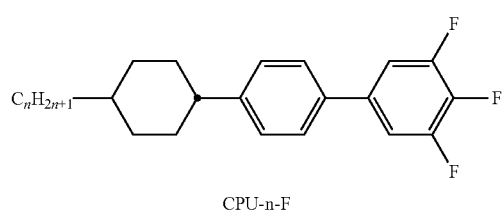
CPU-n-F
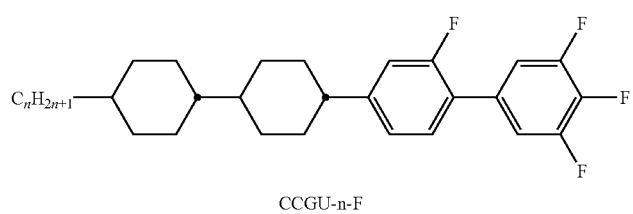
CCGU-n-F
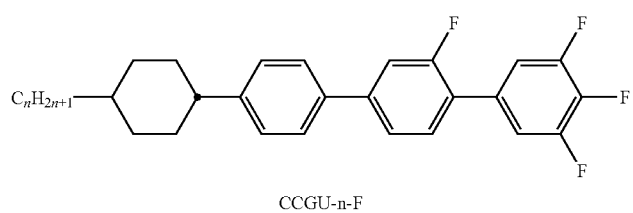
CCGU-n-F
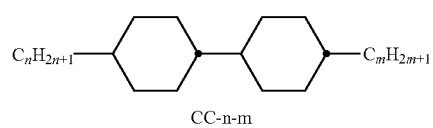
CC-n-m
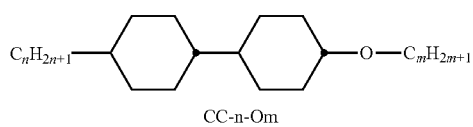
CC-n-Om TABLE D-continued
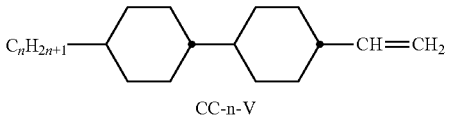
CC-n-V
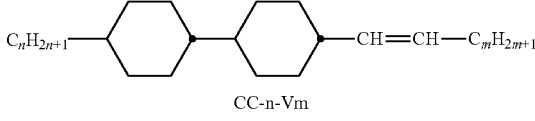
CC-n-Vm
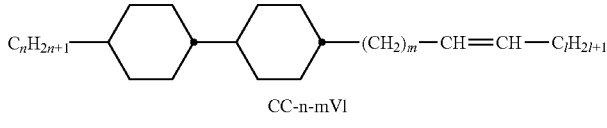
CC-n-mVl
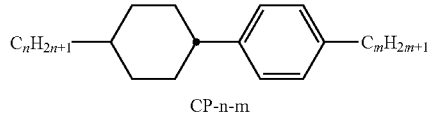
CP-n-m
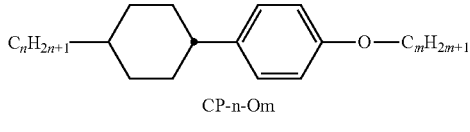
CP-n-Om
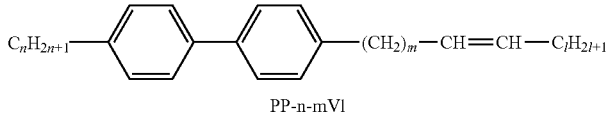
PP-n-mVl
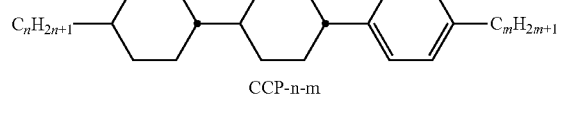
CCP-n-m
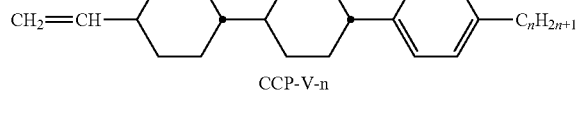
CCP-V-n
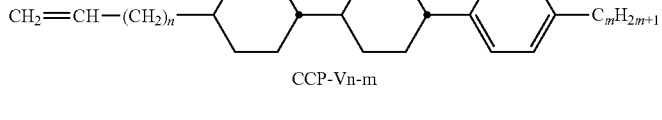
CCP-Vn-m
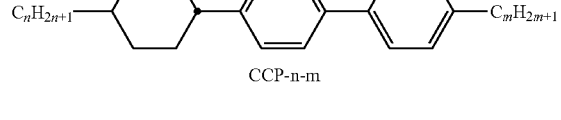
CCP-n-m
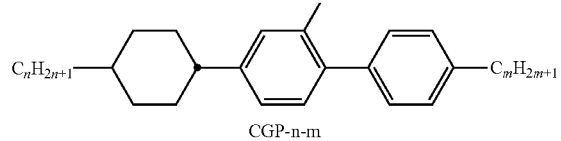
CGP-n-m TABLE D-continued
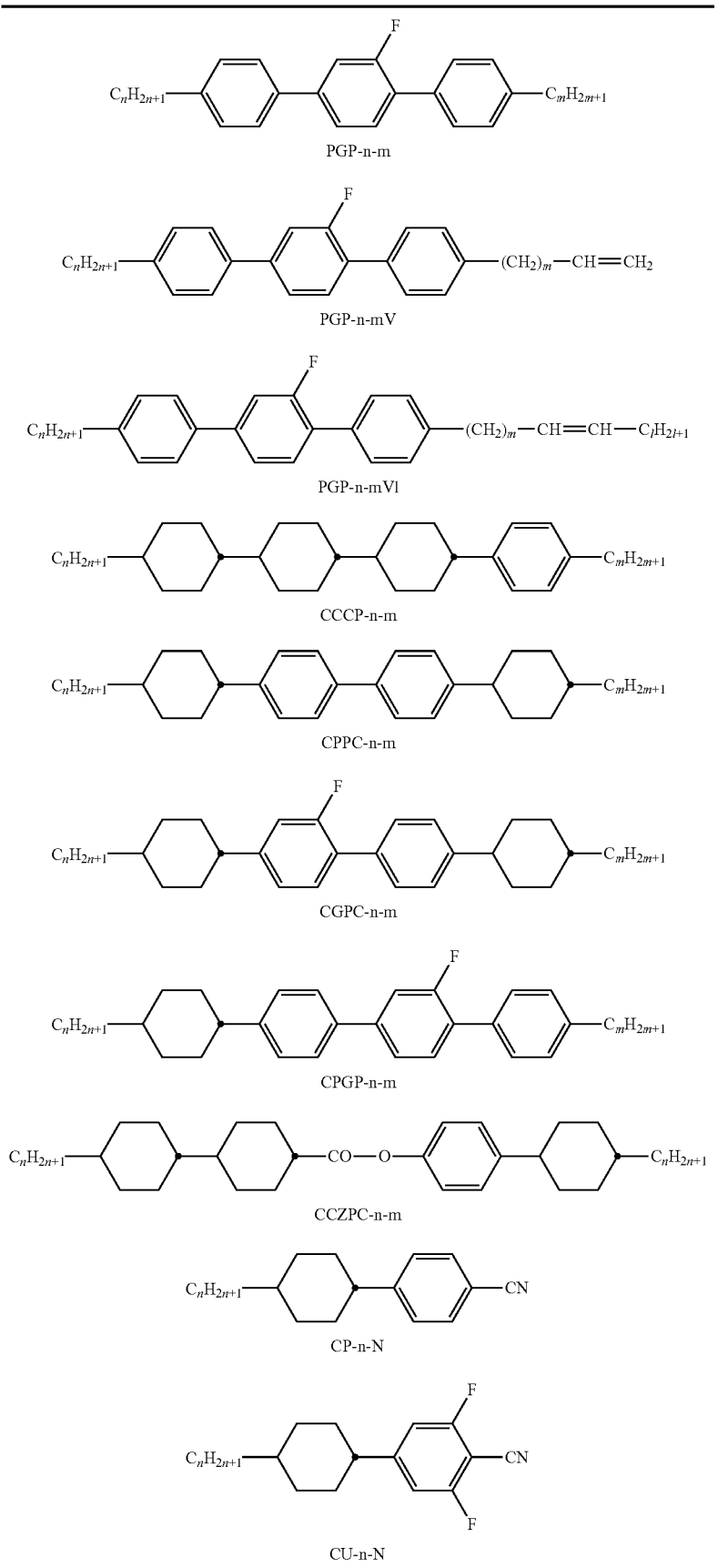

TABLE D-continued
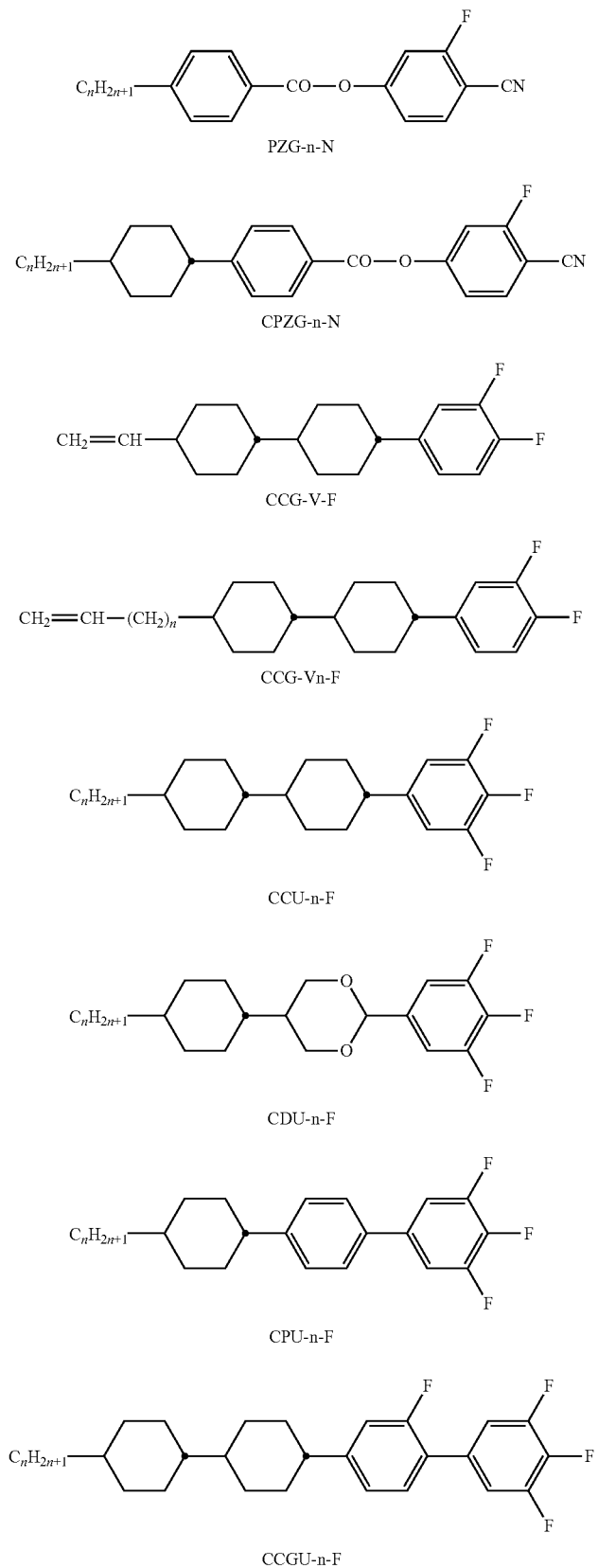

In a similar manner the bimesogenic compounds are labelled. Here, first the central spacer group is given by the number n of —CH$_2$— followed by the code for the respective mesogenic groups written in brackets. Preferably the liquid crystalline media according to the present invention comprise, besides the compound(s) of formula I one or more compounds selected from the group of compounds of the formulae of the following table.

TABLE E

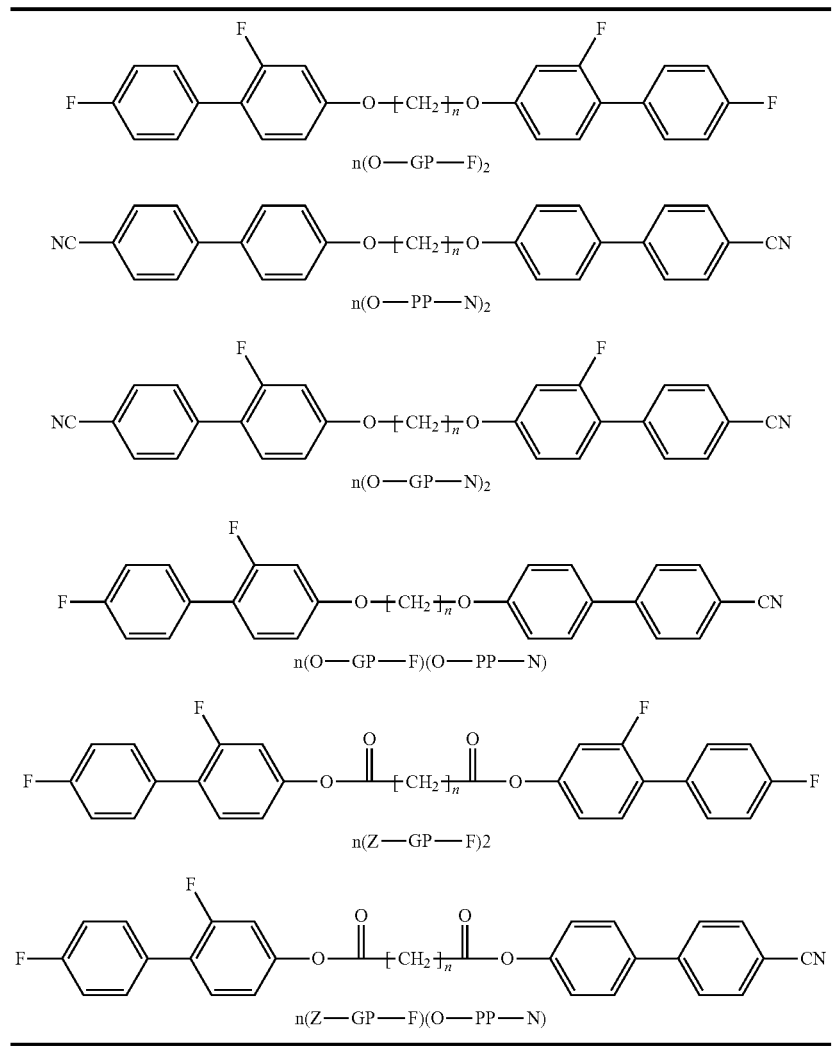

Table F lists chiral dopants, which are preferably used in the liquid crystalline media according to the present invention.

TABLE F

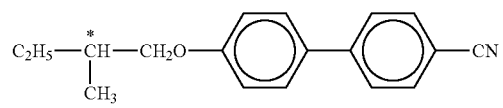

C 15

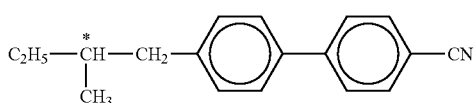

CB 15

TABLE F-continued
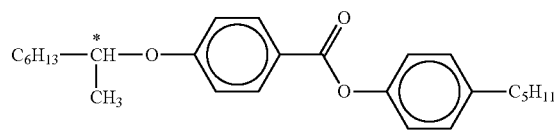
CM 21
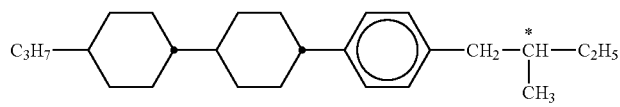
CM 44
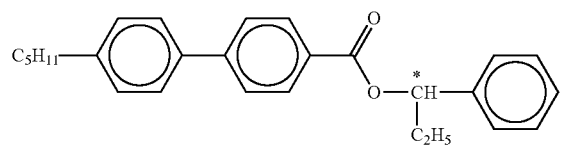
CM 45
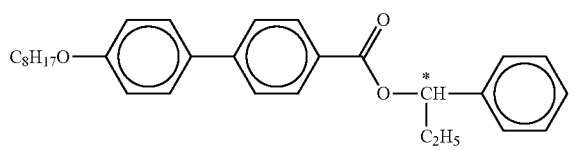
CM 47
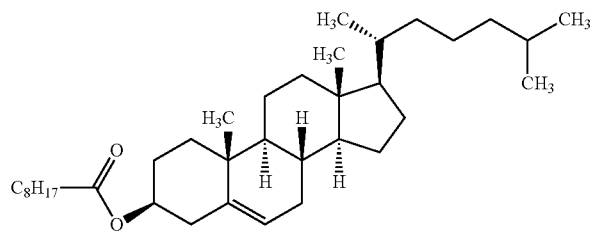
CN
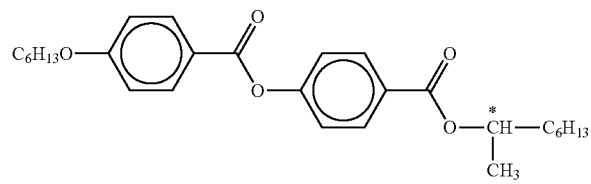
R S-811/S-811
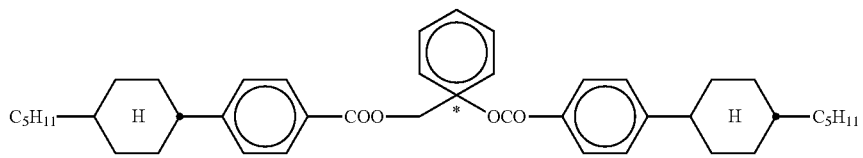
R-1011/S-1011
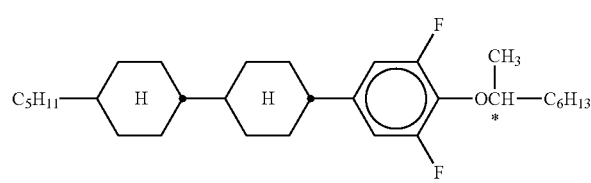
R-2011/S-2011

TABLE F-continued
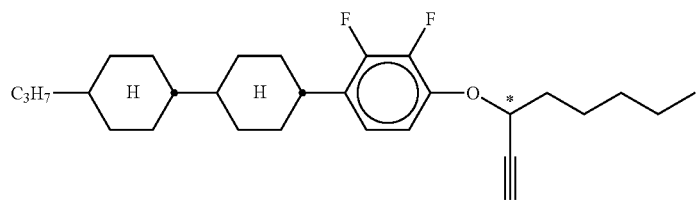
R-3011/S-3011
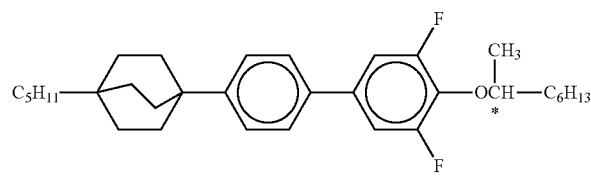
R-4011/S-4011
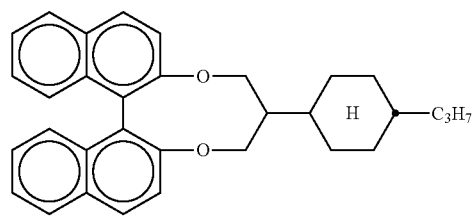
R-5011/S-5011
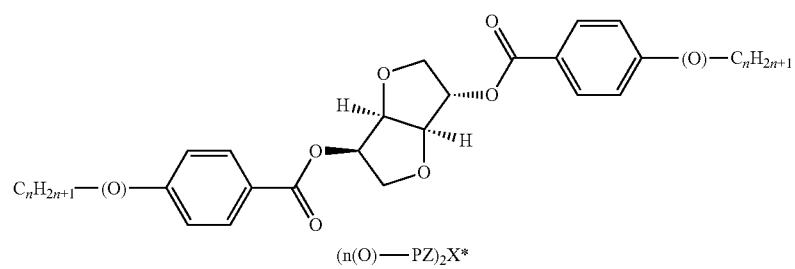
(n(O)—PZ)$_2$X*
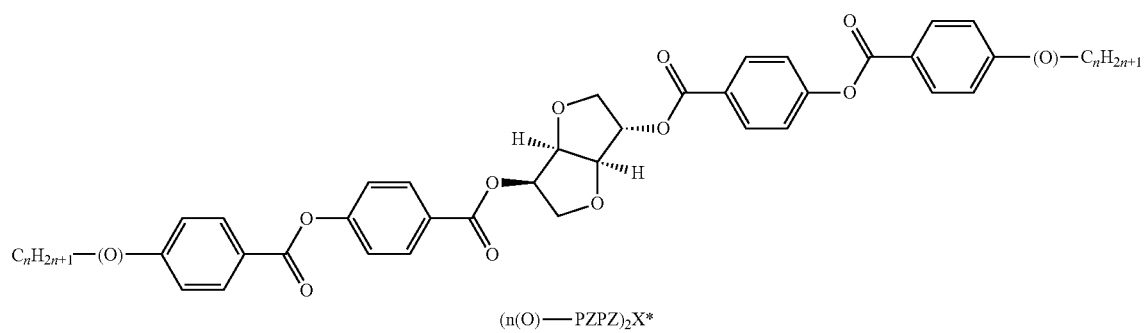
(n(O)—PZPZ)$_2$X*

In a preferred embodiment of the present invention the media according to the present invention comprise one or more compounds selected from the group of compounds of table F.
Table G lists stabilizers, which are preferably used in the liquid crystalline media according to the present invention.
TABLE G
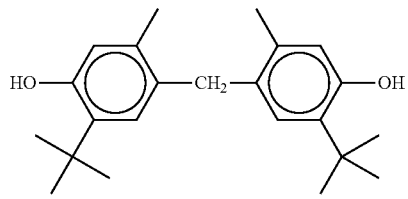
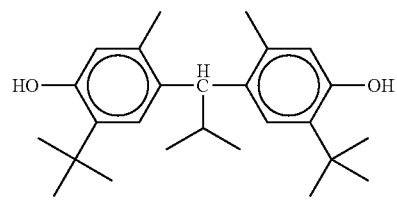
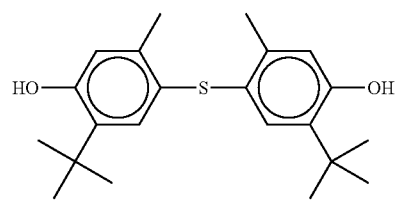
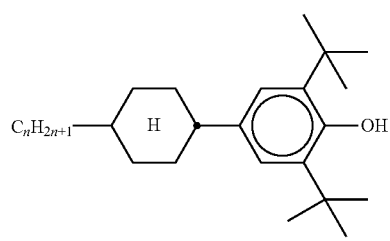
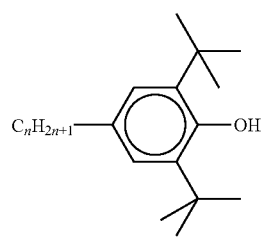
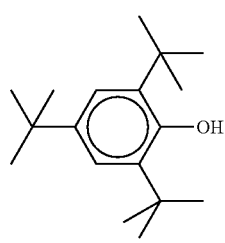

TABLE G-continued
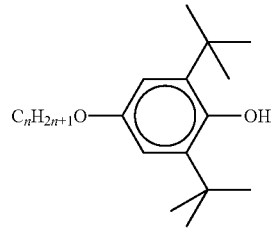
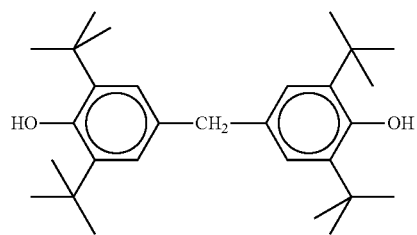
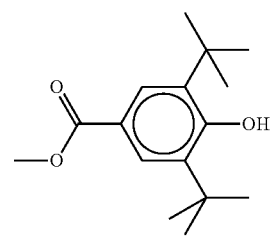
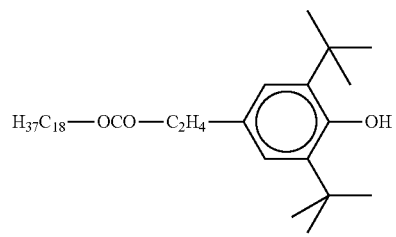
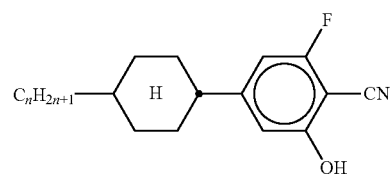
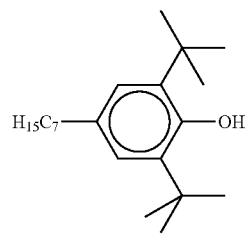

TABLE G-continued
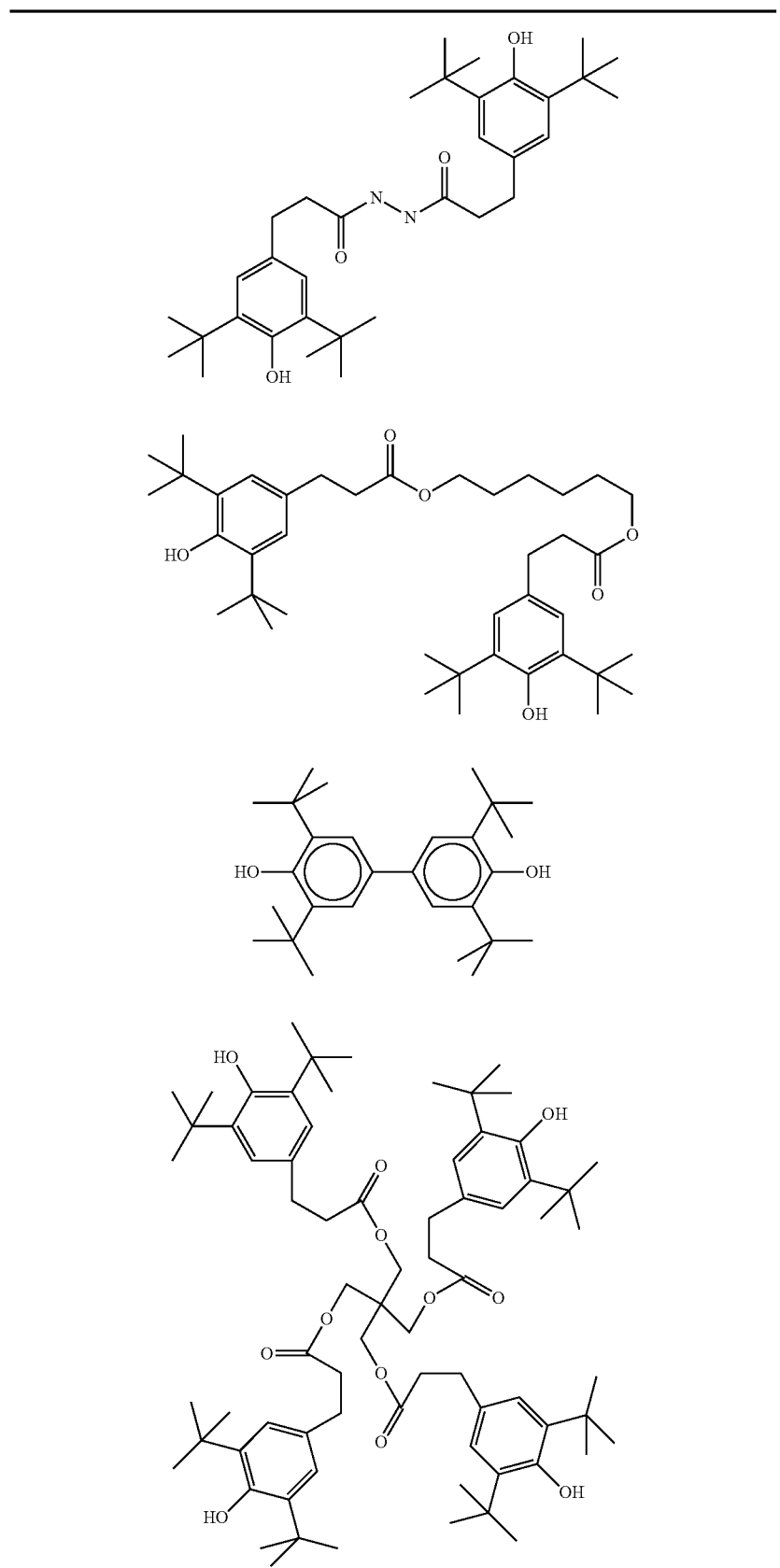

TABLE G-continued
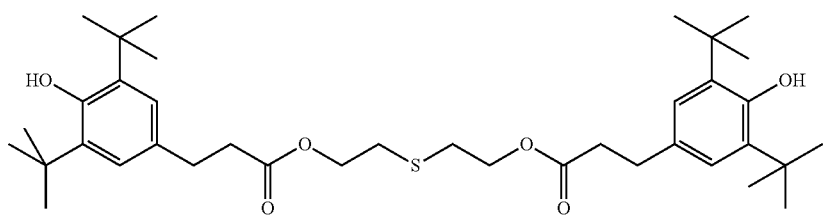 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
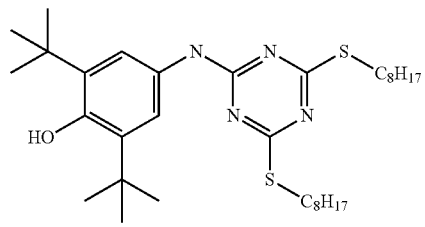
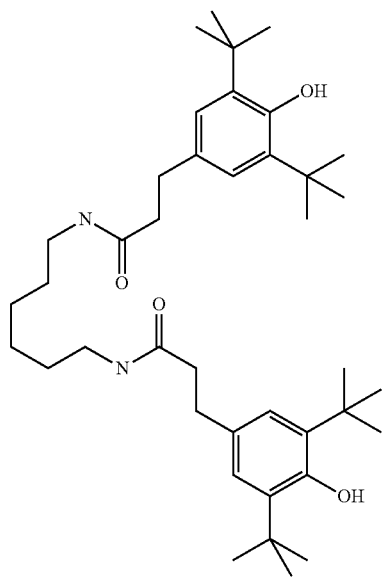 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
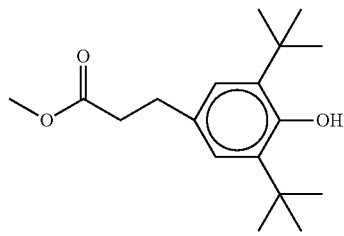
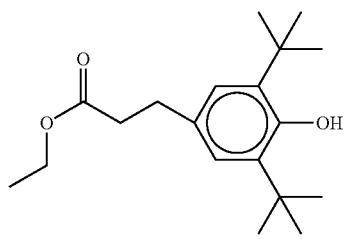

TABLE G-continued
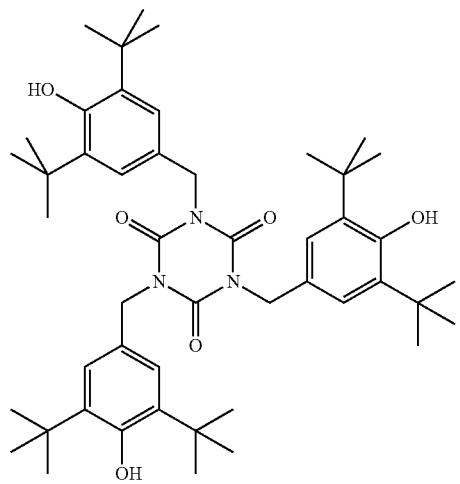 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
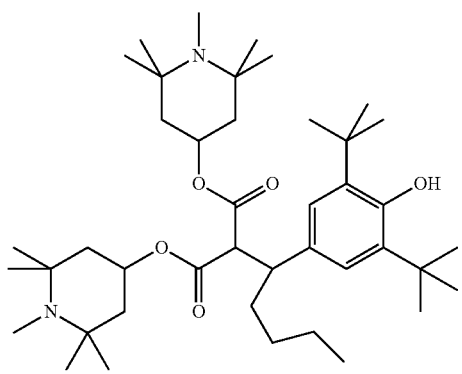 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
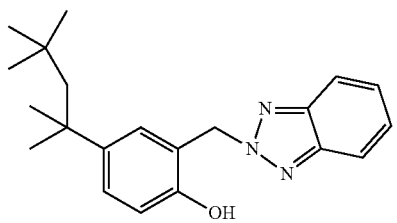 [SMILES: CC(C)(C)CC(C)(C)c1ccc(O)c(Cn2nc3ccccc3n2)c1]
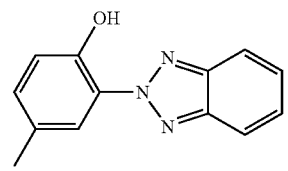 [SMILES: Cc1ccc(O)c(-n2nc3ccccc3n2)c1]
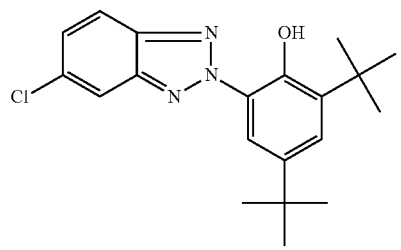 [SMILES: CC(C)(C)c1cc(-n2nc3ccc(Cl)cc3n2)c(O)c(C(C)(C)C)c1]

TABLE G-continued
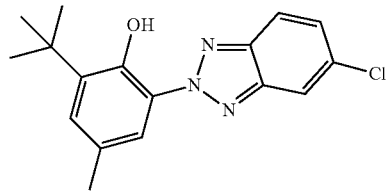 [SMILES: Cc1cc(-n2nc3ccc(Cl)cc3n2)c(O)c(C(C)(C)C)c1]
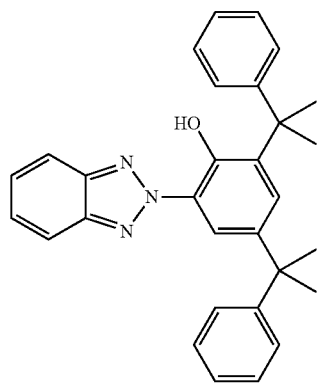 [SMILES: CC(C)(c1ccccc1)c1cc(-n2nc3ccccc3n2)c(O)c(C(C)(C)c2ccccc2)c1]
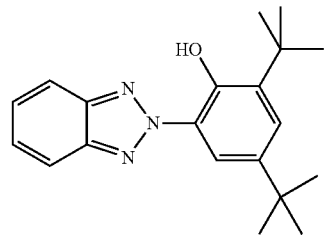 [SMILES: CC(C)(C)c1cc(-n2nc3ccccc3n2)c(O)c(C(C)(C)C)c1]
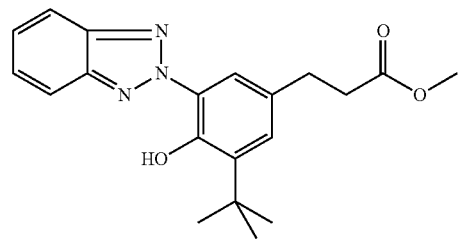 [SMILES: COC(=O)CCc1cc(-n2nc3ccccc3n2)c(O)c(C(C)(C)C)c1]
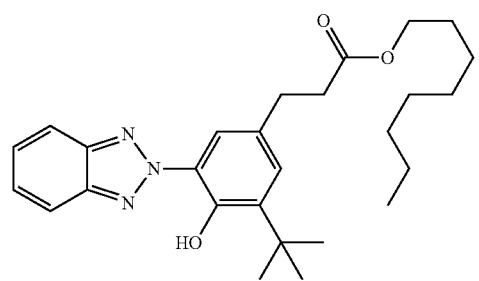 [SMILES: CCCCCCCCOC(=O)CCc1cc(-n2nc3ccccc3n2)c(O)c(C(C)(C)C)c1]

TABLE G-continued
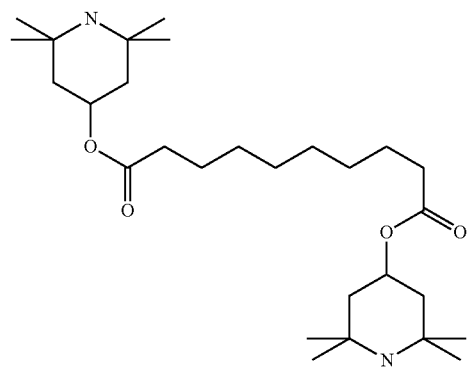
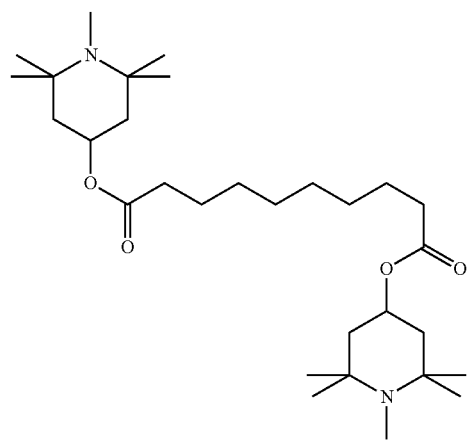
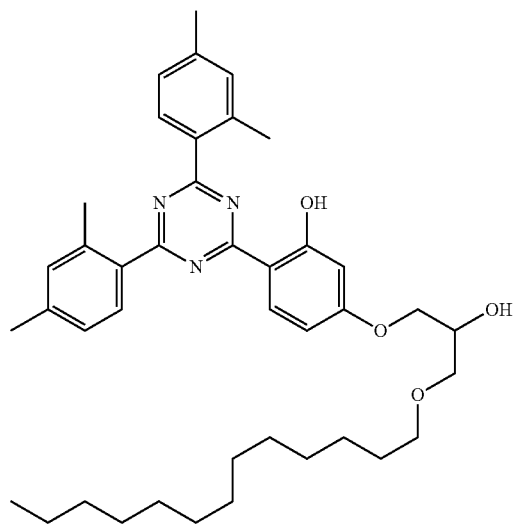 [SMILES: CCCCCCCCCCCCCOCC(O)COc1ccc(-c2nc(-c3ccc(C)cc3C)nc(-c3ccc(C)cc3C)n2)c(O)c1]

TABLE G-continued

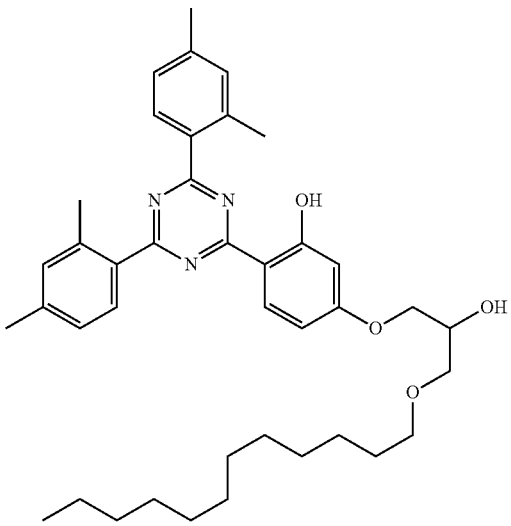 [SMILES: CCCCCCCCCCCCOCC(O)COc1ccc(-c2nc(-c3ccc(C)cc3C)nc(-c3ccc(C)cc3C)n2)c(O)c1]

Remark: In this table "n" means an integer in the range from 1 to 12.

In a preferred embodiment of the present invention the media according to the present invention comprise one or more compounds selected from the group of compounds of table F.

The liquid crystalline media according to the present invention comprise preferably four or more, preferably six or more, compounds selected from the group of compounds of table D, preferably
seven or more, preferably eight or more compounds, preferably compounds of three or more different formulae, selected from the group of formulae of table D.

EXAMPLES

The examples given in the following are illustrating the present invention without limiting it in any way.

However, the physical properties and compositions illustrate for the expert, which properties can be achieved and in which ranges they can be modified. Especially the combination of the various properties, which can be preferably achieved, is thus well defined for the expert.

Liquid crystal mixtures are realized with the compositions and properties given in the following tables. Their optical performance is investigated.

Comparative Example 0

The following liquid crystalline mixture consisting of bimesogens is prepared and investigated.

TABLE 1

Composition and Properties of Liquid Crystal Mixture A-0

| | Composition Compound | |
|---|---|---|
| No. | Abbreviation | Conc./% |
| 1 | 9(O-GP-F)$_2$ | 25.0 |
| 2 | 9(O-GP-F) (O-PP-N) | 25.0 |

TABLE 1-continued

Composition and Properties of Liquid Crystal Mixture A-0

| | | |
|---|---|---|
| 3 | 9(Z-GP-F)$_2$ | 25.0 |
| 4 | 9(Z-GP-F) (Z-PP-N) | 25.0 |
| Σ | | 100.0 |

| Physical Properties | |
|---|---|
| T (N, I) = | n.d. ° C. |

Remarks:
n.d.: not determined.

5% of the chiral dopant R-5011 available from Merck KGaA, Darmstadt, Germany, are added to 95.0% of the mixture A-0 from example 1 to prepare a respective cholesteric mixtures called mixture A-1, having a relatively short cholesteric pitch. After addition of the chiral dopant the mixture is heated to a temperature of 110° C. and kept at this temperature for 10 minutes. Then it is allowed to cool down to ambient temperature again.

TABLE 2a

| Comparison of Composition | | | |
|---|---|---|---|
| | Example | | |
| | C. E. 0 | C. E. 1 | C. E. 2 |
| | | Mixture | |
| | A-1 | B-1 | C-1 |
| Material | | Concentration/% | |
| | Composition | | |
| A-0 | 95.0 | 0.0 | 0.0 |
| B-0 | 0.0 | 95.0 | 0.0 |
| | 0.0 | 0.0 | 95.0 |
| R-5011 | 5.0 | 5.0 | 5.0 |
| Σ | 100.0 | 100.0 | 100.0 |
| | PPhysical Properties | | |
| T (N, I)/° C. | n.d. | n.d. | n.d. |

Remarks:
n.d.: not determined.

The mixture A-1 is filled into a LC cell of the IPS type having a cell gap in the range from 5.0 μm to 5.5 μm and having parallel stripe electrodes with a separation between the adjacent electrodes of 9 μm. The inner surfaces of the substrates forming the test cells are covered with an alignment layer (PI) and treated by rubbing to achieve a planar orientation of the liquid crystalline material, leading to the so called uniformly standing helix alignment.

The liquid crystalline mixture in this cell shows electro-clinic switching. This cell requires a relatively high operation voltage. The threshold voltage being at more than 120 V and the saturation voltage even being at more than 200 V. Further the electro-optical characteristic shows both a marked hysteresis and a significant residual transmission in the dark state of up to as much as 30% of the bright state.

TABLE 2b

Comparison of Results

| | Example | | |
|---|---|---|---|
| C:E 0 | C. E. 1 | C. E. 2 | |
| | Mixture | | |
| A-1 | B-1 | C-1 | |
| Electro-optical performance | | | |
| $V_{10}(on)/V$ | 115 | 55 | n.d. |
| $V_{50}(on)/V$ | 175 | 70 | n.d. |
| $V_{90}(on)/V$ | >200 | 85 | n.d. |
| $V_{90}(off)/V$ | 150 | 90 | n.d. |
| $V_{50}(off)/V$ | 25 | 70 | n.d. |
| $V_{10}(off)/V$ | n.d. | n.d. | n.d. |
| Trans.(off)/% | 12 | 10 | n.d. |

Remarks:
n.d.: not determined.

Comparative Example 2

Next a strongly dielectrically positive liquid crystalline mixture (B-0) with the composition shown in the following table is realized.

TABLE 3

Composition and Properties of Liquid Crystal Mixture B-0

| | Composition Compound | |
|---|---|---|
| No. | Abbreviation | Conc./% |
| 1 | PZG-2-N | 9.0 |
| 2 | PZG-3-N | 9.0 |
| 3 | PZG-4-N | 12.0 |
| 4 | PZG-5-N | 12.0 |
| 5 | PZU-V2-N | 13.0 |
| 6 | CCG-3-OT | 2.0 |
| 7 | CCU-3-F | 4.0 |
| 8 | CCU-5-F | 4.0 |
| 9 | CDU-3-F | 4.0 |
| 10 | CDU-5-F | 4.0 |
| 11 | CCGU-3-F | 10.0 |
| 12 | CPZG-3-N | 4.0 |
| 13 | CPZG-4-N | 3.0 |
| 14 | CCPC-3-3 | 4.0 |
| 15 | CCPC-3-4 | 3.0 |
| 16 | CCPC-3-5 | 3.0 |
| Σ | | 100.0 |

| Physical Properties | |
|---|---|
| T (N, I) = | 82.0° C. |
| $n_e$ (20° C., 589.3 nm) = | 1.6349 |
| Δn (20° C., 589.3 nm) = | 0.1461 |
| $\epsilon_\parallel$ (20° C., 1 kHz) = | 79.1 |
| Δε (20° C., 1 kHz) = | 67.7 |

5% of the chiral dopant R-5011 available from Merck KGaA, Darmstadt, Germany, are added to 95.0% of the mixture B-0 from example 1 to prepare a respective cholesteric mixtures called mixture B-1, having a relatively short cholesteric pitch. After addition of the chiral dopant the mixture is heated to a temperature of 110° C. and kept at this temperature for 10 minutes. Then it is allowed to cool down to ambient temperature again.

The mixture B-1 is filled into a LC cell of the IPS type and investigated as described under comparative example above. The results are shown in table 2b.

Example 1

Examples 1.1 to 1.4

In this example the host mixture B-0 from comparative example 2 is doped again with the chiral dopant R-5011, like in that comparative example. But now it is subsequently stabilized by polymerization of a polymer precursor consisting of both a mono-reactive mesogen and a di-reactive mesogen. As mono-reactive mesogen "MRM-A"

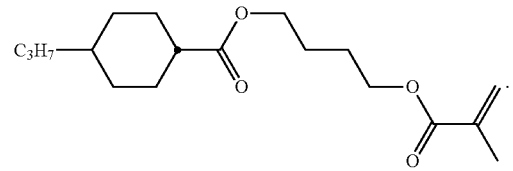

is used and as di-reactive mesogen "DRM-A"

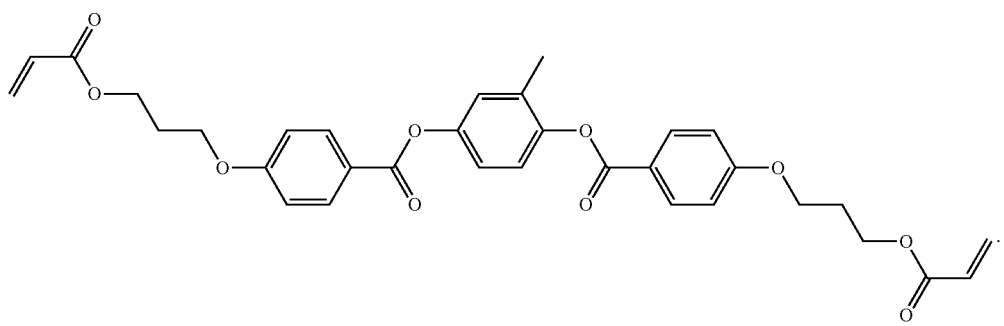 [SMILES: C=CC(=O)OCCCOc1ccc(C(=O)Oc2ccc(OC(=O)c3ccc(OCCCOC(=O)C=C)cc3)c(C)c2)cc1 ; "."]

is used here. Also a polymerization initiator Irgacure651 from Ciba, Switzerland, called "IRG-651"

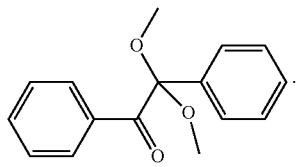 [SMILES: COC(OC)(C(=O)c1ccccc1)c1ccccc1 ; "."]

is used here.

The concentrations of the components are varied as show in the following table.

TABLE 4a

Composition and Properties of Liquid Crystal Mixtures B-2.1 to B-2.4

|  | Example | | | |
|---|---|---|---|---|
|  | 1.1 | 1.2 | 1.3 | 1.4 |
|  | Mixture | | | |
| Material | B-2.1 | B-2.2 | B-2.3 | B-2.4 |
|  | Conc./% | | | |
| Composition | | | | |
| A-0 | 84.8 | 88.8 | 85.8 | 89.8 |
| R-5011 | 5.0 | 5.0 | 4.0 | 4.0 |
| MRM-A | 5.0 | 3.0 | 5.0 | 3.0 |
| DRM-A | 5.0 | 3.0 | 5.0 | 3.0 |
| IRG-651 | 0.2 | 0.2 | 0.2 | 0.2 |
| Σ | 100.0 | 100.0 | 100.0 | 100.0 |
| Physical Properties | | | | |
| T (N, I)/° C. | n.d. | n.d. | n.d. | n.d. |

Remarks:
n.d.: not determined.

These samples are the further processed as follows. After addition of the chiral dopant, in the amount corresponding to its respective concentration in the final mixture, the resultant intermediate mixture is heated to a temperature of 110° C. and kept at this temperature for 10 minutes. Then it is allowed to cool down to ambient temperature again. Then the two reactive mesogens are added in their respective concentrations together with the polymerization initiator. The final mixture is heated to a temperature of 60° C. and kept at this temperature for another 10 minutes. Then it is allowed to cool down to ambient temperature again.

After filling the mixtures into the respective cells, these cells are placed in a hot stage, heated to a temperature of 80° C. and subsequently allowed to cool down to ambient temperature again. This latter part of the process furthers the uniform alignment of the material. Finally the reactive mesogens of the polymer pecursor is polymerized by exposure to UV radiation (wavelength 365 nm) with a radiation power of 5 mW for 15 minutes.

The cells with the cured polymer, i.e. the polymerized polymer precursors, are then investigated for their electro-optical performance. The results are shown in table . . .

TABLE 4b

Comparison of Results

|  | Example | | | |
|---|---|---|---|---|
|  | 1.1 | 1.2 | 1.3 | 1.4 |
|  | Mixture | | | |
|  | A-2.1 | A-2.2 | A-2.3 | A-2.4 |
| Electro-optical performance | | | | |
| $V_{10}$(on)/V | 95 | 80 | 75 | 52 |
| $V_{50}$(on)/V | 155 | 120 | 120 | 90 |
| $V_{90}$(on)/V | 200 | 140 | 175 | 105 |
| $V_{90}$(off)/V | 170 | 110 | 145 | 85 |
| $V_{50}$(off)/V | 125 | 95 | 100 | 75 |
| $V_{10}$(off)/V | 95 | 73 | 75 | 51 |
| Transm.(off)/% | <1 | <1 | <1 | <1 |

Example 1.5

In this example, additionally to the compounds R-5011, MRM-1, DRM-1 and IRG-651, 10% of the bimesogic compound 9(Z-GP-F)(Z-PP-N) are used in the host mixture B-0 from comparative example 2.

Comparative Example 2

Next another strongly dielectrically positive liquid crystalline mixture (C-0) with the composition shown in the following table is realized.

TABLE 3

Composition and Properties of Liquid Crystal Mixture C-0

| Composition | | |
|---|---|---|
| Compound | | |
| No. | Abbreviation | Conc./% |
| 1 | PZG-2-N | 9.0 |
| 2 | PZG-3-N | 9.0 |
| 3 | PZG-4-N | 14.0 |
| 4 | PZG-5-N | 10.0 |
| 5 | PZU-V2-N | 16.0 |
| 6 | CU-3-N | 2.0 |
| 7 | CPZG-3-N | 4.0 |
| 8 | CCZU-2-F | 4.0 |
| 9 | CCZU-3-F | 8.0 |
| 10 | CCZU-5-F | 4.0 |
| 11 | CCPC-3-3 | 5.0 |
| 12 | CCPC-3-4 | 5.0 |
| 13 | CCPC-3-5 | 5.0 |
| 14 | CGPC-3-5 | 3.0 |
| 15 | CGPC-5-5 | 3.0 |
| Σ | | 100.0 |
| Physical Properties | | |
| T (N, I) = | | 81.0° C. |
| $n_e$ (20° C., 589.3 nm) = | | 1.6421 |
| Δn (20° C., 589.3 nm) = | | 0.1436 |
| $\epsilon_{\parallel}$ (20° C., 1 kHz) = | | 81.9 |
| Δε (20° C., 1 kHz) = | | 69.5 |

5% of the chiral dopant R-5011 available from Merck KGaA, Darmstadt, Germany, are added to 95.0% of the mixture C-0 from example 1 to prepare a respective cholesteric mixtures called mixture C-1, having a relatively short cholesteric pitch. After addition of the chiral dopant the mixture is heated to a temperature of 110° C. and kept at this temperature for 10 minutes. Then it is allowed to cool down to ambient temperature again.

The mixture C-1 is filled into a LC cell of the IPS type and investigated as described under comparative example above. The results are shown in table 2b.

Example 2

Analogously to example 1 the mixture comprising the host mixture C-0 and the chiral dopant R-5011 is polymer-stabilized.

The invention claimed is:
1. A liquid crystal medium which comprises:
  a chiral component, component A, consisting of one or more chiral compounds, in an amount such that the medium exhibits selective reflection at a wavelength outside of the visible range of the electromagnetic spectrum ranging from 400 nm to 800 nm,
  a bimesogenic component, component B, consisting of one or more bimesogenic compounds,
  a liquid crystalline component, component C, consisting of one or more liquid crystalline mesogenic compounds, and
  a reactive mesogenic component, component D, comprising, one or more mono-reactive mesogenic compounds and one or more poly-reactive mesogenic compounds.
2. A liquid crystal medium according to claim 1, which further comprises:
  a polymerisation initiator.
3. A liquid crystal medium according to claim 1, wherein the liquid crystalline mesogenic compounds of component C comprise:
  one or more compounds of formula III'

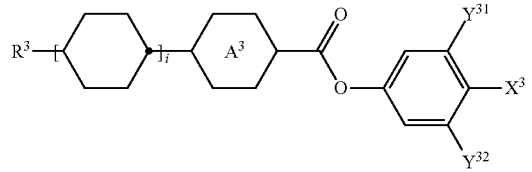

wherein
$R^3$ is alkyl, alkoxy, fluorinated alkyl or fluorinated alkoxy, alkenyl, alkenyloxy, alkoxyalkyl, fluorinated alkenyl or fluorinated alkenyloxy, preferably alkyl or alkoxyalkyl and most preferably n-alkyl,

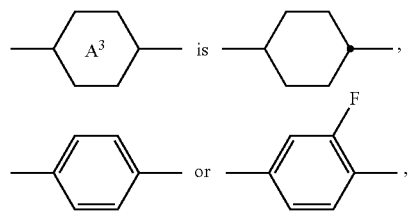

$Y^{31}$ and $Y^{32}$ are independently of each other H or F, preferably $Y^{31}$ is F and $Y^{32}$ is H,
$Y^3$ is CN or NCS, preferably CN, and
i is 0 or 1.

4. A liquid crystal device comprising a liquid crystal medium according to claim 1.
5. A process for stabilizing a liquid crystal medium according to claim 1, which comprises polymerizing the reactive mesogenic component, component D.
6. A polymer stabilized liquid crystal material obtained by polymerizing a liquid crystal medium according to claim 1.
7. A liquid crystal display, which comprises a liquid crystal medium according to claim 1.
8. A liquid crystal display according to claim 7, wherein the liquid crystal medium is aligned in the uniformly standing helix mode.
9. A liquid crystal display according to claim 7, characterised in that it is addressable by an active matrix.
10. A process for the preparation of a composite comprising a liquid crystalline material and a polymeric material by polymerisation of a polymer precursor in a liquid crystalline medium according to claim 1.
11. A process for the preparation of a liquid crystal display comprising polymerizing a polymer precursor in a liquid crystalline medium according to claim 1.
12. A process for the preparation of a liquid crystal display comprising polymerizing one or more reactive mesogenic compounds of component D in a liquid crystalline medium according to claim 1.
13. A liquid crystal medium according to claim 1, wherein the chiral component A is provided in an amount such that the medium exhibits selective reflection at a wavelength below of the visible range of the electromagnetic spectrum ranging from 400 nm to 800 nm.
14. A liquid crystal medium according to claim 1, wherein the bimesogenic compounds of component B comprise:
  one or more compounds of formula II:

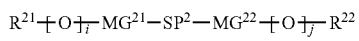

wherein
$R^{21}$ and $R^{22}$ are each, independently of one another, F, Cl, CN, $NO_2$, NCS, SCN, OCN, a straight-chain or branched alkyl group with 1 to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCOO—, —S—CO—, —CO—S—, —CH═CH—, —CH═CF—, —CF═CH—, —CF═CF— or —C≡C— in such a manner, that in the whole molecule oxygen atoms are not linked directly to one another, or, in case they are not linked to an O atom, one or both of them may be H;
$MG^{21}$ and $MG^{22}$ are each, independently of one another, a mesogenic group,
$SP^2$ is a divalent spacer group comprising 1 to 40 C atoms, it being also possible for one or more $CH_2$ groups in the spacer groups to be replaced, in each case independently from one another, by —O—, —S—, —NH—, —N($CH_3$)—, —CO—, —COO—, —OCO—, —OCOO—, —S—CO—, —CO—S—, —CH═CH—, —CH═CF—, —CF═CH—, —CF═CF—, —$CF_2$— or —C≡C— in such a manner, that oxygen atoms are not linked directly to one another;
i and j are, independently of each other, 0 or 1.
15. A liquid crystal medium according to claim 1, wherein the dielectric anisotropy (Δ∈) of the liquid crystal medium is in the range of 60 to 90.

16. A liquid crystal medium according to claim 1, wherein the medium comprises the chiral dopant R-5011 or its enantiomer S-5011

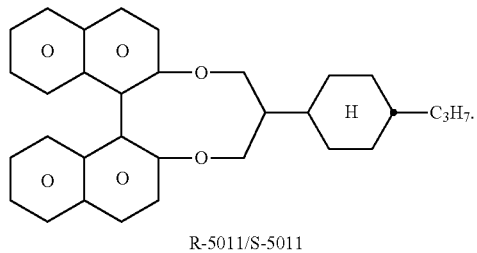

R-5011/S-5011

17. A liquid crystal medium according to claim 16, wherein the concentration of the chiral dopant R-5011 or its enantiomer S-5011 in the medium is from 4.0 to 5.0% by weight.

18. A liquid crystal display which comprises a polymer stabilized liquid crystal material according to claim 6.

19. A liquid crystal display according to claim 18, wherein the liquid crystal material is aligned in the uniformly standing helix mode.

20. A process for the preparation of a composite comprising a liquid crystalline material and a polymeric material wherein the process comprises polymerizing one or more reactive mesogenic compounds of component D in a liquid crystalline medium according to claim 1.

21. A liquid crystal medium according to claim 1, wherein the one or more poly-reactive mesogenic compounds in component D include one or more di-reactive mesogenic compounds.

22. A liquid crystal medium according to claim 1, wherein component D includes one or more isotropic reactive compounds.

* * * * *